(12) United States Patent
Quoc et al.

(10) Patent No.: US 8,103,590 B2
(45) Date of Patent: *Jan. 24, 2012

(54) METHOD AND SYSTEM FOR MANAGING MULTIPLE CATALOGS OF FILES ON A NETWORK

(75) Inventors: Michael Quoc, San Francisco, CA (US); Derek Dukes, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 11/616,202

(22) Filed: Dec. 26, 2006

(65) Prior Publication Data

US 2007/0198364 A1    Aug. 23, 2007

Related U.S. Application Data

(60) Provisional application No. 60/774,924, filed on Feb. 17, 2006.

(51) Int. Cl.
- G06F 21/00 (2006.01)
- G06F 17/00 (2006.01)
- G06F 17/30 (2006.01)
- G06F 15/16 (2006.01)

(52) U.S. Cl. ............. 705/52; 705/51; 705/78; 705/904; 707/688; 707/694; 707/783; 709/203

(58) Field of Classification Search ............. 705/26–27, 705/57, 44, 75, 1, 51–52, 71, 901–902, 904, 705/909, 77, 78; 709/220–225, 203–204; 725/26–33; 713/165–167, 176; 707/609, 707/688, 694–696, 758, 785, 821–822, 827, 707/830, 923, 705–707, 737–739, 783, 912–916, 944, 1–2, 9–10, 100, 102, 104.1, 200; 715/743, 789; 717/174–178

See application file for complete search history.

(56) References Cited

U.S. PATENT DOCUMENTS 5,678,041 A * 10/1997 Baker et al. ............... 707/9
(Continued)

FOREIGN PATENT DOCUMENTS

WO    WO 2005/060199    *    6/2005
(Continued)

OTHER PUBLICATIONS

Sonera Plaza Ltd MediaLab "Digital Rights Management White Paper", Feb. 3, 2002 15 pages.*

(Continued)

*Primary Examiner* — Srirama Channavajjala
(74) *Attorney, Agent, or Firm* — Greenberg Traurig, LLP

(57) ABSTRACT

Systems and methods have been developed for managing multiple catalogs of files on a network. The systems and methods may manage a catalog of files with rights for sale and a catalog of rights presented for free public use. The systems and methods may manage these multiple catalogs via determining when one file should be moved from one catalog into another. The systems and methods may manage rights presented in the files, including rights offered for sale, rights offered for free use, where the managing may include changing the classification of those rights based on data relating to the files. The systems and methods may provide the ability to a user to research whether rights in the file are for sale.

28 Claims, 15 Drawing Sheets

U.S. PATENT DOCUMENTS

| | | | |
|---|---|---|---|
| 6,389,538 B1 | 5/2002 | Gruse et al. | |
| 6,708,157 B2 * | 3/2004 | Stefik et al. | 705/59 |
| 6,735,699 B1 * | 5/2004 | Sasaki et al. | 726/28 |
| 6,807,641 B1 * | 10/2004 | Ishiguro et al. | 714/6 |
| 6,920,567 B1 | 7/2005 | Doherty et al. | |
| 7,257,714 B1 * | 8/2007 | Shen | 713/186 |
| 2002/0052933 A1 | 5/2002 | Leonhard et al. | |
| 2002/0112069 A1 * | 8/2002 | Sim | 709/236 |
| 2002/0138471 A1 * | 9/2002 | Dutta et al. | 707/3 |
| 2003/0065642 A1 * | 4/2003 | Zee | 707/1 |
| 2004/0003139 A1 * | 1/2004 | Cottrille et al. | 709/331 |
| 2004/0003398 A1 * | 1/2004 | Donian et al. | 725/34 |
| 2004/0143736 A1 * | 7/2004 | Cross et al. | 713/165 |
| 2004/0205333 A1 * | 10/2004 | Bjorkengren | 713/153 |
| 2004/0220791 A1 * | 11/2004 | Lamkin et al. | 703/11 |
| 2005/0050315 A1 * | 3/2005 | Burkhardt et al. | 713/150 |
| 2005/0071663 A1 * | 3/2005 | Medvinsky et al. | 713/200 |
| 2005/0119977 A1 * | 6/2005 | Raciborski | 705/59 |
| 2005/0125302 A1 * | 6/2005 | Brown et al. | 705/26 |
| 2006/0041512 A1 * | 2/2006 | Stefik | 705/57 |
| 2006/0135127 A1 * | 6/2006 | Aarnio et al. | 455/412.1 |
| 2006/0167882 A1 * | 7/2006 | Aydar et al. | 707/9 |
| 2007/0156607 A1 * | 7/2007 | Miloslavsky et al. | 705/77 |

FOREIGN PATENT DOCUMENTS

| | | | |
|---|---|---|---|
| WO | WO 2006/029978 | * | 3/2006 |
| WO | PCT/US2007/062447 | | 2/2007 |
| WO | PCT/US2007/062450 | | 2/2007 |

OTHER PUBLICATIONS

Steve Kenny et al. "Applying digital rights management systems to privacy rights management",Computers & Security vol. 21, No. 7, pp. 648-664, 2002.*

Jan De Clercq,"New Authorization Tracks: Role-Based Access Control and Digital Rights Management", Windows Server 2003 Security Infrastructures, 2004, pp. 417-440.*

Carlos Serrão et al. "Protection of MP3 Music Files Using Digital Rights Management and Symmetric Ciphering", Proceedings of the Second International Conference on Automated Production of Cross Media Content for Multi-Channel Distribution (AXMEDIS'06), 2006, 8 pages.*

U.S. Appl. No. 11/616,199, filed Dec. 26, 2006, Michael Lee Quoc et al.

U.S. Appl. No. 11/616,190, filed Dec. 26, 2006, Michael Lee Quoc et al.

U.S. Appl. No. 11/616,166, filed Dec. 26, 2006, Michael Lee Quoc et al.

U.S. Appl. No. 11/616,155, filed Dec. 26, 2006, Michael Quoc.

Notification Concerning Transmittal of International Preliminary Report on Patentability (PCT/US2007/062447) dated Aug. 28, 2008.

Notification Concerning Transmittal of International Preliminary Report on Patentability (PCT/US2007/062450) dated Aug. 28, 2008.

* cited by examiner

METHOD AND SYSTEM FOR MANAGING MULTIPLE CATALOGS OF FILES ON A NETWORK

RELATED APPLICATIONS

This application claims the benefit of U.S. Provisional Application No. 60/774,924 filed Feb. 17, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The expansion of the Internet and the World Wide Web ("web") has given computer users the enhanced ability access a large variety of digital content. The digital content can take many types of forms, including media. For example, the digital content may be media that a user may listen to and watch through their computers. The digital content may also be media that the user creates on the user's computer, and then "uploads" to another computer, such as a server, in order to share with other users. This media can be in the form of audio music, music videos, television programs, sporting events or any other form of audio or video media that a user wishes to watch or listen to.

The Internet allows users to experience content, share content, download content, upload content and create content. The Internet is often, therefore, used as a tool to distribute and copy content, sometimes illegally or in violation of rights owned in that content. For example, music piracy using the Internet is a significant problem for owners of rights in music. Another example, is the violation of copyrights in images that are easily copied and reformatted using the Internet.

Effective enforcement is difficult using the Internet because enforcement relies on identification of content that is violating rights. Most search engines rely on text tags, and therefore, it is difficult to locate automatically content that might be copied or used in violation of rights. Additionally, a search engine that relies solely on text tags of a content file to confirm a violating content file's existence will miss a content file that has been renamed. Thereby a potential infringer may use a content file with near impunity by renaming the file.

While a user may be encouraged to use a file wantonly by the inability to find the owner of the file, that user may also be deterred from using a file by the fear of being subject to legal sanctions for use in violation of the owner's rights. Digital rights management (DRM) systems and methods exist to control access to content files. Such DRM systems and methods may be tailored to specific uses and/or players. DRM systems often restrict access to content files by disabling the content for play (i.e. perception) on disallowed players, or by disabling the recording of the content onto certain types of media (e.g., copying music onto a CD).

SUMMARY

Systems and methods have been developed for managing multiple catalogs of files on a network. The systems and methods may manage a catalog of files with rights for sale and a catalog of rights presented for free public use. The systems and methods may manage these multiple catalogs via determining when one file should be moved from one catalog into another. The systems and methods may manage rights presented in the files, including rights offered for sale, rights offered for free use, where the managing may include changing the classification of those rights based on data relating to the files. The systems and methods may provide the ability to a user to research whether rights in the file are for sale.

In one aspect the disclosure describes a method which includes presenting for public use on a publicly accessible network a free right in a first content file, periodically calculating a popularity index for the first content file, the popularity index being based on current usage data of the content file, and based on a comparison of the popularity index with a threshold, offering for sale on the publicly accessible network a pre-designated right in second content file.

The pre-designated right in the content file may be different from the free right in the content file. The free right in the first content file may be a right to access the first content file in a first format and the pre-designated right in the second content file may be a right to access the second content file in a second format. The free right in the first content file may be a right to render the first content file from a remote location and the pre-designated right in the second content file may be a right to copy the second content file to a permanent computer-readable medium.

The pre-designated right in the second content file may be a right in the second content file authorized by an owner to be offered for sale. In one embodiment, the owner owns a master right in the first content file and the master right in the second content file, the master right including a right to distribute the free right and a right to distribute the pre-designated right. In another embodiment, the method includes selecting the pre-designated right from a plurality of different pre-designated rights, wherein each of the plurality of different pre-designated rights is a different right authorized by the owner to be offered for sale in the second content file. In another embodiment, the method includes receiving the second content file from the owner, and receiving a request from the owner to present for public use on the publicly accessible network the free right in the first content file. The usage data of the first content file may be data selected from user requests for the first content file, user ratings of the first content file, and user ratings of a different commonly owned content file.

The method may include creating the threshold based on information received from the owner. The method may include limiting distribution of the free right in the first content file based on the comparison of the popularity index with the threshold.

The method may include receiving an unknown file, and matching the unknown file to the second content file. In one embodiment, the method may include calculating the popularity index in response to matching the unknown file to the second content file. Calculating the popularity index may be performed based on unknown file usage data. The unknown file usage data may include user requests for the unknown file.

In another aspect, the disclosure describes a method which includes presenting for public use on a publicly accessible network a free right in a content file, receiving a request from a user to purchase a first right in the content file, determining whether the first right in the content file is authorized by an owner to be offered for sale, wherein the owner owns the first right in the content file, and, if the first right is authorized by the owner to be offered for sale, offering the first right in the content file for sale to the user.

The first right may be different from the free right. The first right in the content file may be a right to access the content file in a first format and the free right in the content file may be a right to access the content file in a second format. The first right in the content file may be a right to render the content file from a remote location and the free right in the content file may be a right to copy the content file to a permanent computer-readable medium. The owner may own a master right in the content file, the master right including a right to distribute the free right and a right to distribute the first right.

The method may include receiving, from the owner, a request to offer the first right in the content file for sale based on receiving the request from the user to purchase the first right in the content file, wherein the receiving the request from the owner is performed before the receiving the request from the user. The method may include, if the first right is authorized by the owner to be offered for sale, offering the first right in the content file for public sale on the publicly accessible network. The method may include limiting distribution of the free right in the content file based on the receiving the request from the user.

In another aspect, the disclosure describes a system which includes a community server which presents for public use on a publicly accessible network a free right in a content file, a cataloging engine which calculates a popularity index for the content file, wherein the popularity index is based on current usage data of the content file, and wherein the community server offers for sale on the publicly accessible network a pre-designated right in the content file based on a comparison of the popularity index with a threshold.

The community server may receive a request from a user to buy the pre-designated right in the content file, wherein the community server presents for sale on the publicly accessible network the pre-designated right in the content file based on the request received. The pre-designated right in the content file may be different from the free right in the content file. The first right in the content file may be a right to access the content file in a first format and the free right in the content file may be a right to access the content file in a second format. The first right in the content file may be a right to render the content file from a remote location and wherein the free right in the content file may be a right to copy the content file to a permanent computer-readable medium.

The pre-designated right in the content file may be a right in the content file authorized by an owner to be offered for sale. The owner may own a master right in the content file, the master right in the content file including a right to distribute the free right in the content file and a right to distribute the pre-designated right in the content file. The system may include an arbitration engine which selects the pre-designated right from a plurality of different pre-designated rights, wherein each of the plurality of different pre-designated rights is a different right in the content file authorized by the owner to be offered for sale.

The community server may receive the content file from the owner, and the community server may receive a request from the owner to present for public use on the publicly accessible network the free right in the content file. The community server may create the threshold based on information received from the owner. The usage data of the content file may be data selected from user requests for the content file, user ratings of the content file, and user ratings of other content files associated with the owner. The community server may retrieve usage data of the content file from a database selected from a ratings database, a user information database, and a metagraphics database.

The community server may limit distribution of the free right in the content file based on the comparison of the popularity index with the threshold. The community server may receive an unknown file. The system may include a comparison engine which determines whether the unknown file is related to the content file based on matching a bit print of the unknown file and a bit print of the content file. The cataloging engine may calculate the popularity index if the unknown file is related to the content file. The cataloging engine may calculate the popularity index based on unknown file usage data. The unknown file usage data may include user requests for the unknown file.

A BRIEF DESCRIPTION OF THE DRAWINGS

DETAILED DESCRIPTION OF THE INVENTION

The following description of various embodiments is merely exemplary in nature and is in no way intended to limit the invention, its application, or uses. While various embodiments have been described for purposes of this specification, various changes and modifications may be made which will readily suggest themselves to those skilled in the art and which are encompassed in the spirit of the invention both disclosed herein and as defined in the appended claims.

Systems and methods have been developed for monitoring and moderating files on a network. The systems and methods may provide the ability for a publisher of a file to review the uses and users of the file on a network and the ability for a publisher to negotiate and sell rights in the file. The systems and methods may provide the ability to a user to research who owns a file and whether rights in the file are for sale. For example, the systems and methods may provide the ability to a user to request to buy rights in the file, even if there is not presently an offer to sell the rights.

Figure 1:
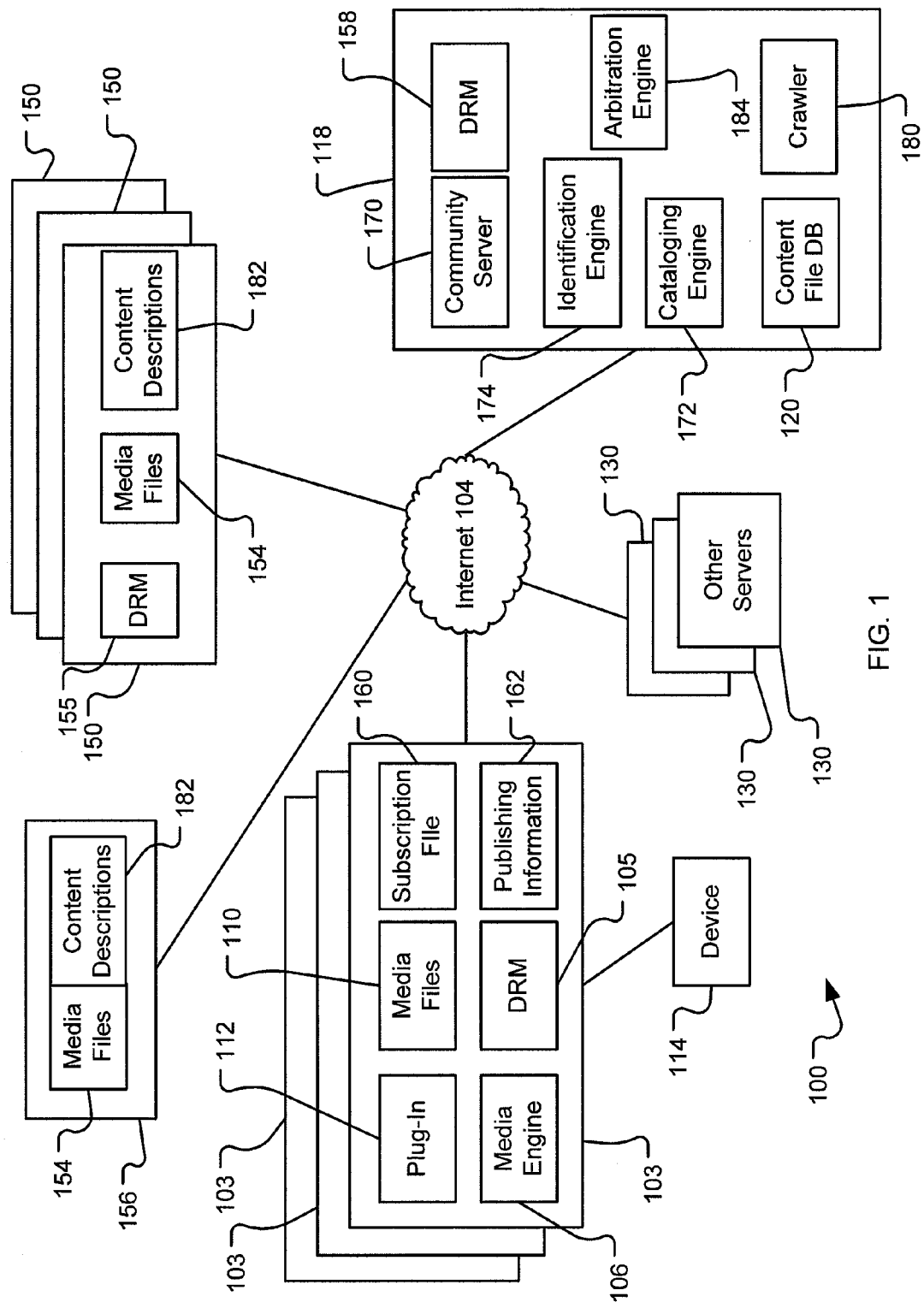
FIG. 1 illustrates a system for monitoring and moderating files over a network.

FIG. 1 illustrates a system 100 for monitoring and moderating files over a network. The system 100 includes a digital marketplace 118, processors 103, servers 130, 150 and 156, each at least with some degree of interconnection to the Internet 104.

In one embodiment, a user utilizes a processor 103, such as personal computer (PC), web enabled cellular telephone, personal digital assistant (PDA) or the like, coupled to the Internet 104 by any one of a number of known manners. Furthermore, each processor 103 preferably includes an Internet browser (not shown), such as that offered by Microsoft Corporation under the trade name INTERNET EXPLORER, or that offered by Netscape Corp. under the trade name NETSCAPE NAVIGATOR, or the software or hardware equivalent of the aforementioned components that enable networked intercommunication between users and service providers and/or among users. Each processor also includes a media engine 106 that, among other functions to be further described, provides the ability to convert information or data into a perceptible form and to manage media related information or data so that user may personalize their experience with various media. Media engine 106 may be incorporated into processor 103 by a vendor of processor 103, or obtained as a separate component from a media engine provider or in some other art recognized manner. As will be further described below, it is contemplated that media engine 106 may be a software application, or a software/firmware combination, or a software/firmware/hardware combination, as a matter of design choice, that serves as a central media manager for a user and facilitates the management of all manner of media files and services that the user might wish to access either through a computer or a personal portable device or through network devices available at various locations via a network.

Processor 103 also may include storage of local media files 154 and/or other plug-in programs that are run through or interact with the media engine 106. Processor 103 also may be connectable to one or more devices 114 such as a compact disc player and/or other external media file player, commonly referred to as an MP3 player, such as the type sold under the trade name iPod by Apple Computer, Inc., that is used to portably store and play media files.

Additionally, processor 103 may contain Digital Rights Management (DRM) software 105 that protects the copyrights and other intellectual property rights of the user's media files by enabling secure distribution and/or preventing or hampering illegal distribution of the media files. In one embodiment, DRM 105 encrypts or decrypts the media files for controlled access by authorized users, or alternatively for marking the content with a digital watermark or similar marking so that the content can not be freely distributed. Media engine 106 preferably uses the DRM information to ensure that the media files being experienced through media engine 106 are not copied to or shared with users that are unauthorized to listen to or view the content. In one embodiment, server 150 may also use its own DRM software 155 to protect media files. In another embodiment, the DRM software 105 is compatible (or of the same type/format) as the DRM software 155. In yet another embodiment, the DRM software 105 is incompatible (e.g., a different type/format) with the DRM software 155.

The processor 103 may include software necessary to subscribe to podcasts. In the embodiment shown, the processor 103 includes a subscription file 160, such as an Outline Processor Markup Language (OPML) file. The subscription file 160 maintains information that identifies what podcasts the user has subscribed to. The subscription file 160 may include a list of feeds and the feed locations.

In one embodiment, the processor 103 also includes publication information 162. In one embodiment, publication information 162 include information that user wishes to apply to content files that the user intends to publish. In one embodiment, the user may wish to publish or make available content (e.g., offer for sale rights in content files) on a limited basis, such as through making available low-resolution versions of images or movies. In another embodiment, the user may wish to publish every file located in a particular location immediately under a set of default terms (e.g., rights available, prices for certain rights, length of license terms).

In one embodiment, the digital marketplace 118 may include information about a user's devices 114. The information allows the digital marketplace 118 to identify the device and differentiate it from the processor 103. Furthermore, it is anticipated that a single user may have multiple different processors 103 and each processor 103 may be associated with different information. For example, a user may subscribe to a news podcast on a mobile device such as a smart phone 103 or similar Internet connected mobile device 103 and may own rights to a content file for use on a home computer 103. In one embodiment, the digital marketplace 118 contains all this information. In one embodiment, the digital marketplace 118 may include the same information contained in the processor's subscription file 160 for each processor 103 associated with the user. In another embodiment, the digital marketplace 118 may include one or more files in the OPML file format for each user.

In one embodiment of the present invention, similar to the DRM software 105 located on the user's processor 103, the digital marketplace 118 may maintain its own DRM software 158 which tracks the digital rights of media files located either in the content file database 120 or stored on a user's processor. Thus, for example, before the digital marketplace 118 streams or serves up or transfers any media files to a user, it validates the rights designation of that particular piece of media and only serves, streams, or transfers the file if the user has the appropriate rights.

In one embodiment, the system 100 includes a number of servers 150 that contain content files. That is, the servers 150 include media files 154 so that they can be retrieved by a subscription manager on a processor 103. In one embodiment, the server 150 includes content descriptions for the media files 154 stored on the server. In another embodiment, the server 150 includes content descriptions for media files 154 stored on other servers (e.g., 130, 156). In one embodiment, the server 150 includes its own DRM software 155, as described further herein.

As illustrated in FIG. 1, each user's processor 103, the digital marketplace 118 and servers 150, as well as the other servers 130, 156 are communicatively connected via the Internet 104. In alternate embodiments, different components of the system may be communicatively coupled differently, for example each may be coupled directly to each other wirelessly or by a local or wide area network (WAN) or the like. Additionally, functional components can be distributed so that certain functions of media engine may be performed at the digital marketplace 118, or vice versa, or distributed in modular fashion for operation at various locations throughout the system 100. Thus, the description herein of a function or component being associated with a particular device or component or location is merely exemplary.

In the embodiment shown, the digital marketplace 118 is represented by a single system that comprises an identification engine 174, a cataloging engine 172, an arbitration engine 184, a community server 170, a file database 120, and a crawler 180. In other embodiments, the digital marketplace 118 may comprise other elements and may be distributed across multiple servers or other entities. For example, many methods are known in the art for distributing functionalities across entities connected, for example by networks such as the Internet.

In one embodiment, the community server 170 utilizes information and services from the cataloging engine 172, the identification engine 174, the arbitration engine 184, the file database 120, and the crawler 180 to interact with a user.

In one embodiment, the identification engine 174 creates a unique identifier (e.g., bit print, digital fingerprint, digital watermark) of every content file either publicly or privately available. The identification engine may encounter or receive files in a number of ways. For example, a user may upload the file to the digital marketplace. As another example, a file locating engine (e.g., a crawler 180) may automatically search via an algorithm or pseudo randomly, or otherwise "crawl" a public network such as the Internet. Crawling by a file-locating engine, for example, may be any type of process of automatically traversing a network and scanning for files. For example, crawling may be a step-wise indexing of websites. Alternatively, a file locating engine (crawler) may focus its search on commonly-used sites where files are uploaded, perceived and/or downloaded. The identification engine may create a unique identifier for the content file encountered/received. The identification engine will be described further herein.

In one embodiment, the cataloging engine 172 catalogs unique identifiers relating to the files identified by the identification engine 174. Each file may be for sale, free for distribution or use, or otherwise may have its rights determined by the publisher (and/or creator) of the file. In one embodiment, the cataloging engine 172 maintains and stores information relating to the files identified by the identification engine. For example, the information handled by the cataloging engine 172 may include a file's unique identifier(s) (e.g., bit print(s)), rights available in the file, and usage statistics of the file. The cataloging engine 172 amasses information relating to files encountered which can be used to cross-reference attributes of files previously identified by the identification engine, such as usage versus rights allocated, parties using the file versus parties authorized to use a file, and derivative works created using the file. The cataloging engine will be described further herein.

In one embodiment, the arbitration engine 184 provides a clearinghouse for the rights relating to content files by arbitrating conflicts of rights, or rights disputes, based on the catalog of unique identifiers within the digital marketplace. In one embodiment, the arbitration engine 184 receives requests for cross-referencing rights and resolves conflicts relating to rights to use a file and its actual usage. The arbitration engine will be described further herein.

The community server 170 provides an interface for the digital marketplace 118 to the user (and/or publisher) and may receive and interpret requests from a user, such as "I would like to put this image on my website." The digital marketplace may interpret these requests as, for example, a request for the identification engine 174 to identify the image file 154, a request for the cataloging engine 172 to locate all related files 154 to the image file, and a request for the arbitration engine 184 to report the presently available rights for those files associated with the image file. The community server 170 may then translate each report or result from each of these requests into a message for the user, such as "the image file you requested is available for license for $X/month." The community server 170 may also allow a publisher of the image file 154, or files associated with it, to view reports on the usage and licensing fees of the file or requests for the file received by the digital marketplace.

In one embodiment, the digital marketplace 118 includes a crawler 180 and a file database 120. In one embodiment, the crawler 180 searches for available or accessible files 154, or "crawls," public and private networks, such as the Internet 104. In one embodiment, the crawler 180 may return network links (e.g., hyperlinks) to files 154, or may return the files themselves to the digital marketplace 118. In one embodiment the crawler 180 crawls networks randomly. In another embodiment, the crawler 180 crawls networks based on ratings or meta-graphic data related to content files 154 known to the digital marketplace 118. In another embodiment, the crawler 180 crawls a network according to an algorithm. For example, the algorithm may be developed for that network or developed for finding a particular type of file.

In one embodiment, the digital marketplace 118 may store files in the file database 120. For example, files 154 stored in the file database 120 may be files found by the crawler 180, may be files created by the digital marketplace 118 (e.g., by a user through the community server, or by any other process that creates files or versions of files as described herein), or may be files submitted by the user. In another embodiment, the digital marketplace 118 may encounter (e.g., become aware of, obtain a copy of) a file 154, with or without the publisher's knowledge or permission.

In one embodiment, the crawler 180 may find content files 154 used (e.g., displayed, distributed) on a public network, yet the crawler 180 may not know to whom the content file belongs. In one embodiment, the crawler 180 may report to the cataloging engine 172, the identification engine 174, and the arbitration engine 184 that it has encountered the content file 154.

In one embodiment, files 154 encountered while crawling are processed and/or stored by the digital marketplace 118 in a manner similar to files submitted by users/publishers. In one embodiment, the rights associated or stored with a file 154 may differ depending on whether that file was encountered through crawling or through submission by a putative publisher. In another embodiment, the circumstances in which the file 154 was encountered may also be associated or stored with the rights. For example, such circumstances when the file was encountered may include, whether the file 154 was under Creative Commons license, what entity was hosting the content file, how the content file was displayed, and what, if any, digital rights management (DRM) measures were included with the file.

As used herein, the term unique identifier includes anything used to identify a file. In one embodiment, a unique identifier is unique in that no other file may have the same unique identifier. For example, a unique identifier may include the time the file was processed by a part of the digital marketplace as well as information contained in the file, thereby making each unique identifier strictly unique. In another embodiment, a unique identifier is not strictly unique. For example, a unique identifier may be a bit print which is based on the content of a file as it would be perceived by a user, thereby allowing another file to have the same unique identifier if the other file has a sufficiently similar perception of its content.

In another embodiment, a unique identifier contains a bit print for comparison purposes and a strictly unique element (e.g., a time stamp) for identification and tracking purposes. The addition of a strictly unique element will be understood by those with skill in the art, and, wherever bit prints are discussed herein, it should be understood that a bit print may be a part of a unique identifier.

As used herein the term bit print can be any format of information that helps to identify a file. For example, in an embodiment a bit print may be as simple as a file name or a URL of a file. Alternatively, a bit print may be a very complicated mathematical or formulaic representation of the data in the file. The bit print may be unique to the file, or may be shared by other similar files, depending on the architecture using the bit print. A bit print may include information from metadata that is attached to or part of the content file. An example of metadata is ID3 tagging for MP3 files. In one embodiment, the metadata may used in the creation of a bit print. In another embodiment, a bit print is created from the perceptible information in the content file. In another embodiment, a bit print is created from a combination of the perceptible information in the content file and the metadata of the content file.

The processes of bit print generation may use techniques known to those with skill in the art to create bit prints from content files such as correlation with a "master" content file, fuzzy logic, artificial intelligence, neural networks, point matching, and triangulation. Indeed, a bit print may include information derived from the file in any manner, including, but not limited to, convolution of the file, transformation of the file (e.g., Laplace, Fourier, Wavelet), integration of the file, or any other derivative information from the file. In addition, any of these techniques can be combined with identifications comprised in metadata associated with the content file to aid in the creation of the bit print.

As will be appreciated, the information of the file may be perceived in a significantly different than the format in which the information is contained in the file. For example, a .JPG file (or another format associated with the Joint Photographic Experts Group) may be perceived as a photograph of a puppy when viewed through an appropriate viewer. However, the same file is stored as a string of bits (digitally) each representing a value or attribute that is part of that image file. The same file may also be viewed by a text editor and another view of the .JPG file may appear. The bit print may represent any of these types of views of the file, other types of views of the file or a combination.

As used herein, the term content may refer to any file or information capable of digital expression. For example, a motion picture may be represented by a file comprising digital information that, when interpreted by a program or content player, may be perceived by a user. In this example, the term content may represent the motion picture as perceived, the file comprising the digital information, or the digital information itself. In this example, a differently formatted copy of the motion picture may comprise entirely different information and may be referred to as different content. However, it should be understood that the perception of these two motion pictures may be similar and the rights associated with the two pieces of content may be the same rights (and/or owned by the same owner).

As used herein, the term "right" may refer to any right relating to how a media/content file may be used or accessed, such as access rights (including rights to access a file in the first instance), copyright rights (e.g., display, copy, perform, prepare derivative works), rights made by contract (e.g., a contractual right to use a file for a limited purpose, a software license), trademark rights, common law rights, and patent rights.

As used herein the term "right", by itself, should be understood as referring to a classification of a type of right rather than a specific piece of intellectual property in a specific file. For example, a publisher of two files may own the same right in those two files even if the two files are substantially different files. For example, the right owned by such a publisher may be the full bundle of rights afforded to the creators of content files under applicable copyright laws. In other words, the publisher may own a right in one file and may own the same right in another different file. When the term right is used to refer to a specific piece of intellectual property, it will be clearly pointed out which piece of tangible property, e.g., a media file, to which the right pertains.

If two files are substantially similar so that they would be considered the similar, matched, or the same (e.g., for copyright protection purposes), an owner of a transferable right in one file (e.g., a publisher of the file as recognized by the digital marketplace) may sell that right to a user who wishes to use the right with respect to another file. For example, the two files may be in different locations or in different formats and the user wishing to purchase a right may want to keep his copy (e.g., a local copy on his computer) rather than downloading (or otherwise obtaining) a new copy. A user may want to keep the file if it is very large or otherwise difficult to transfer (e.g., installed as a program on a computer). A user may wish to keep his copy because it is in a particular format (e.g., a digital format, a physical format) and the copy offered by the digital marketplace is a different format.

If a particular right is non-exclusive in nature, the publisher of a file who owns the exclusive right from which the non-exclusive right is derived may sell many copies of the non-exclusive right to many parties. It should be understood that the owner of an exclusive right may own many non-exclusive rights as part of the exclusive right. For example, music files may have many non-exclusive licenses sold in them. As another example, the right to use an image file to print the image one time onto a tangible object, such as paper, a garment, or a canvas, may be sold multiple times to many different users. Rights may expire, be extinguished or be used. For example, a right to print an image file or to listen to a music file may be limited to one such printing or listening, and may be extinguished after the use of the right.

If a right is exclusive, the publisher of a file who owns the exclusive right in a file may sell the entirety of the exclusive right in the file only once. For example, a particular right to attend a sporting event (e.g., as represented by a file) may be sold only once. The digital marketplace, as described herein, may track any sales of rights in files for various purposes, including monitoring which users have rights purchased through the digital marketplace and monitoring the rights available for sale for various files.

A right embodied in tangible (e.g., non-electronic) form may be converted into a right embodied in an electronic form, as known to those with skill in the art. For example, a ticket (i.e., a license right) for an event or for travel may be converted to electronic form. The electronic embodiment of a right (e.g., a file) may have a non-exclusive or exclusive nature.

In one embodiment, the digital marketplace protects, monitors, and controls the exclusive nature of the exclusive rights. In another embodiment, the exclusive nature of the exclusive rights is protected, monitored and controlled by another party. There may be other means of enforcing exclusive rights, such as through a control mechanism when the right is used. For example, a piece of DRM software may contact a server when a file is activated. As another example, a barcode on a ticket may be scanned and counted by a computer when the ticket is used, such as upon entrance to an event.

A right such as a right to perceive a known content file may carry with it the same right in the unknown file. For example, the right to perceive the known file may be given to a user, and that right may allow the user to perceive the unknown file. For example, a user may buy a right to use a content file he already owns, such as a video file, through acquiring a right to use another content file of the same video.

A right in a known content file may not carry with it the same right in the unknown file. For example, an owner of a right in the known content file (e.g., a publisher) may not want a particular version of the known content file to be used or distributed, such as a distorted or reformatted version. The selling of a right in the known content file may be a selling of the right only in that version of the content file, such as a master copy. The master copy may be specially formatted by the owner, such as a version containing DRM protection, containing advertisements, or edited a certain way. The unknown content file which was matched to the known content file may be cataloged as a related file. Such a related content file may also be cataloged or designated as a content file which is in an unauthorized version.

As used herein, the term publisher may refer to a user who asserts a marketed or marketable right in a piece of content (e.g., a content file). A user may refer to any person or entity recognized by the digital marketplace. Therefore, publishers are users (and may be referred to simply as users, even though they also assert rights in a piece of content), but users are not necessarily publishers. Furthermore, a user may be a publisher with respect to rights in one or more files, but may only be a user with respect to other rights and/or other files.

Publishers may be offered options by the digital marketplace for promoting or presenting the content in which the publisher has rights. Publishers can set up defaults for sale and presentation including rights available, prices, and presentation format (e.g., sizes, samples, the inclusion in other presentations of the digital marketplace, the inclusion in search results within the digital marketplace). The publisher can control each presentation separately (i.e. control whether a free sample is given, what is required to get next sample). The digital marketplace can allow the publisher to control any of the modes of presentation, sale or negotiation of the rights of the content owned by the publisher, and assert such control through setting up defaults and/or schemas for the digital marketplace to automatically apply to the content rights, through individual custom control for each right owned by the publisher, or through a combination of default and custom control.

Figure 2:
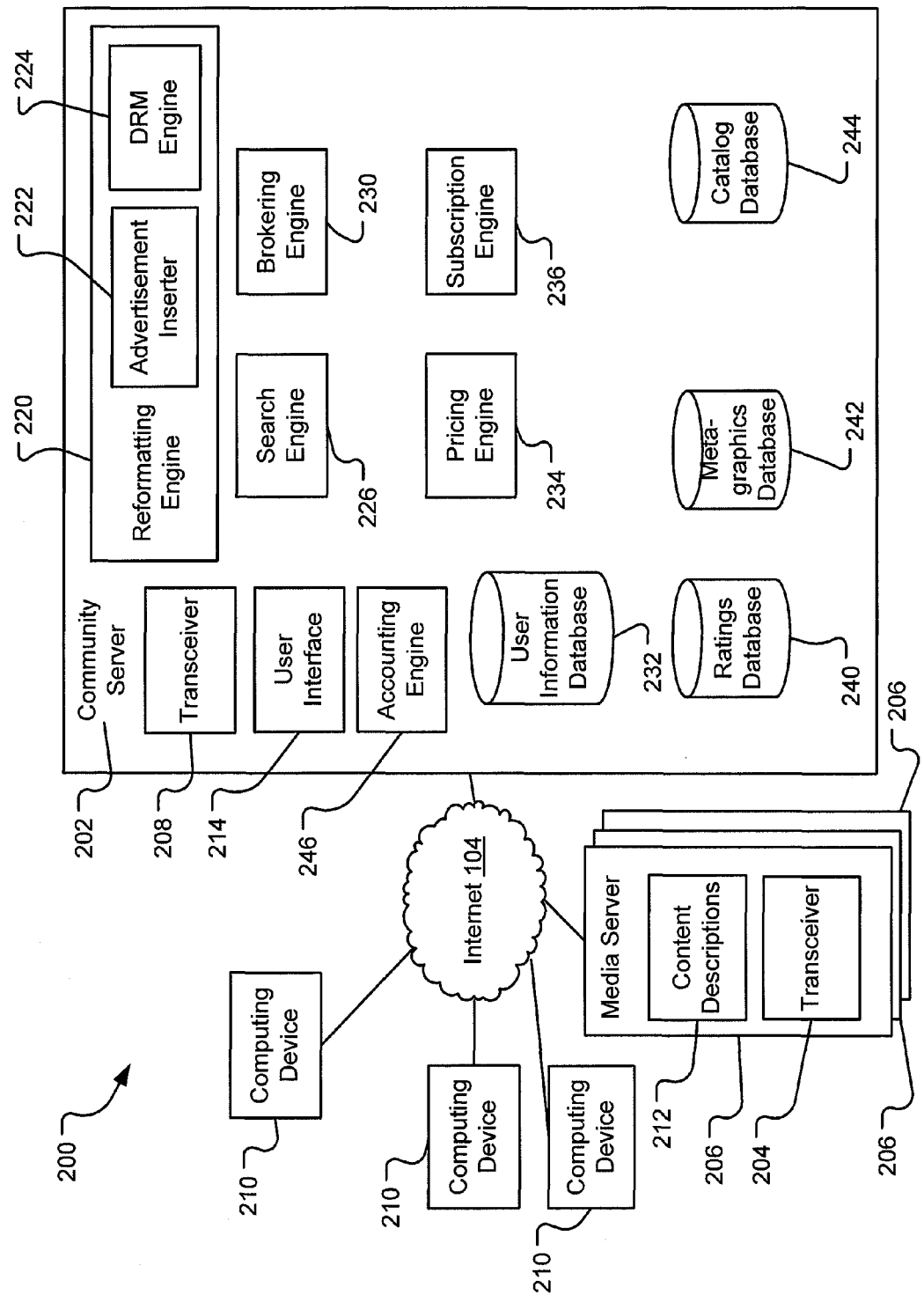
FIG. 2 illustrates an embodiment of a system implementing a digital marketplace.

FIG. 2 illustrates an embodiment of a system 200 implementing a digital marketplace. The system 200 includes computing devices 210, media servers 206 interconnected with a community server 202 via the Internet 104. The community server 202 includes an interface engine 214, a user information database 232, a catalog database 244, a search engine 226, a meta-graphics database 242, a ratings database 240, a subscription engine 236, a pricing engine 234, a brokering engine 230, and a reformatting engine 220. The reformatting engine 220 includes an advertisement inserter 222 and a DRM engine 224. The community server 202 provides a communicative interface between users and the digital marketplace. In one embodiment, the community server 202 provides a clearinghouse for rights in content files. In another embodiment, the community server 202 provides statistics about the usage of content files. In yet another embodiment, the community server 202 provides users with the ability to search for a content file based on, among other things, a file with similar content, metadata associated with the content file, and perceptible attributes of the content file.

In one embodiment, the digital marketplace 200 may create bit prints for elements of a file, and those bit prints may be associated with other bit prints in order to locate uses of those elements in other works. For example, content files may be used to create derivative works or "remixes" of those content files. The digital marketplace and elements therein may search that content file, which may have a new bit print itself, for bit prints of elements used from other content files. Therefore, a file may have a bit print associated with it that is new to the digital marketplace, but there may be identified within the file several bit prints that are known already to the digital marketplace. In one embodiment, these known bit prints may have various rights owned by various other parties. For example, a pop song may be encountered by the digital marketplace that has "samples" or parts of other songs in it. The digital marketplace may identify these parts of the other songs by their bit prints and notify parties having rights in the pop song and in the parts of the other songs.

In one embodiment, the interface engine 214 is in communication with the identification engine, the cataloging engine, and the arbitration engine. The interface engine 214 may provide a user access to a catalog database 244 containing, for example, a database of content files, as well as a history of ownership of the content files, the usages of the content files, and the availability of rights in the content files.

In one embodiment, the user information database 232 provides the interface engine 214 with information about a user to enhance the user's experience with the community server 202. In one embodiment, the user information database 232 may retrieve past searches performed by the user to help tailor the user's searches on subsequent visits. For example, if a user has searched in the past for rock and roll songs, and presently is searching for digital rights relating to attending a concert, the user information database 232 may provide the user interface with information that allows the user interface to tailor that search toward rock and roll concerts. In another embodiment, the user information database 232 may cross-reference a user's search history with the searching histories of other users to create recommendations for the user.

In one embodiment, the community server 202 may include a ratings database 240 relating to content files accessed by users through the community server. In one embodiment, the community server 202 may actively solicit ratings from users. In another embodiment, ratings may be collected for the ratings database 240 through interpretation of a user's actions. For example, if a user searches or accesses content files through the community server, the community server 202 may keep a log file of the user's access. In one embodiment, the community server 202 may analyze the log file in order to obtain ratings of the content files searched for and/or accessed by the user. For example, the rating in a content file may be affected if a user searches for or buys rights in that content file. In another embodiment, when a user's search results include a content file and that same user purchases a number of similar content files, the rating for that content files may be affected.

In one embodiment, the community server 202 includes a meta-graphics database 242. The term "meta-graphics," as used herein, is related to the term demographics, however, instead of relating to attributes such as gender and age, the term meta-graphics relates to information surrounding content files and users in the digital marketplace, such as search histories, ratings, and usage characteristics. For example, a particular type of file may be popular with users of the community server who often search for content files relating to online gaming. The content files that might appeal to this meta-graphic of user might include podcasts relating to gaming hardware, digital assets for games (e.g., gold or swords for online role-playing games), and updates for gaming software. In one embodiment, meta-graphics stored in the meta-graphics database 242 may include all data deemed statistically related to the metadata of content files. In another embodiment, the meta-graphic data stored in the meta-graphic database 242 is related to user information stored (e.g., user metadata, search histories, publisher profiles) in the user information database 232.

In one embodiment, the community server 202 comprises a search engine 226. The search engine may use information from the interface engine 214, the user information database 232, and other databases in the community server 202 to perform a search for content files. In one embodiment, the search engine 226 searches a network, such as the Internet. In another embodiment, the search engine 226 searches databases within the digital marketplace. In one embodiment, the search engine 226 provides searching based on text associated with content file. In another embodiment, the search engine 226 provides searching based on information related to the content files. In yet another embodiment, the search engine 226 provides searching based on meta-graphics relating to users and content files. In one embodiment, the criteria that may be included in a search for content files may include, rights available in content files, classifications of those content files (such as type of content, ratings of content, or popularity of content), recommendations of the content files by other users, and popularity of the content files based on meta-graphics related to the content files or users who accessed the content files. For example, a search may be performed by a user for the most popular puppy photos available. In this example, the search may also be refined by the availability of rights, such as an exclusive right to publish.

In one embodiment, the search engine 226 uses meta-graphic data or user information to tailor searches. In one embodiment, the search engine may filter content file results based on information about the user known to the digital marketplace (for example, the community server 202), information such as search histories from the user, ratings data given by the user, rights purchased by the user, and published content files from the user. In another embodiment, the search engine 226 may tailor a search based on availability of rights, prices of those rights or sponsored (or otherwise subsidized e.g., through advertisements) availability of rights. In yet another embodiment, the search engine 226 may tailor a search based on the time of day of the search or other network conditions. In one embodiment, the search engine 226 may make known to a user the ways in which a search is tailored. In another embodiment, the search engine 226 may keep hidden from a user the ways in which a search is tailored.

In another embodiment, the search engine 226 is able to receive a content file or a link to a content file provided by a user. In one embodiment, the search engine 226 utilizes the cataloging engine and the arbitration engine in order to perform its search based on similar content to a content file received from a user. In performing a similar content-based search, in one embodiment, the search engine 226 may send requests to the identification engine, the arbitration engine, and the cataloging engine. In one embodiment, the identification engine, the arbitration engine, and the cataloging engine assign at least one bit print to the content file submitted by the user, catalog and link the bit print(s) and determine ownership of the rights in the bit print(s). In another embodiment, the cataloging engine reports similar file(s) and/or bit print(s) to the search engine 226. In yet another embodiment, the arbitration engine reports ownership of the rights in the similar file(s) to the search engine 226.

In one embodiment, the search engine 226 receives results from these requests, and provides the user in with a group of results that may include similar content files. In another embodiment, the search engine 226 allows the user to refine his search and search again by selecting content files from these search results (e.g., that match the content file and/or the rights the user is seeking).

As one example, a user may wish to see if the particular picture has any rights that are available for sale, or if anyone owns rights in a particular picture. To initiate a search, the user presents the picture to the search engine 226, along with parameters for the search (e.g., a request to find rights that are available and/or if those rights are for sale.). Then the search engine 226 forwards the file and a request to the identification engine which produces at least one bit print for the file. The bit print or bit prints are then forwarded to the cataloging engine which determines all the related bit prints. The group of a related bit prints is then forwarded to the arbitration engine which determines the relationships between the bit prints in the rights available in the bit prints. The arbitration engine then returns the bit prints and rights available in the bit prints to the community server 202 and the search engine 226. In one embodiment, the search engine 226 at this point may request copies (e.g., full copies, formatted versions, "thumbnails") of each content file represented by the bit prints from the cataloging engine and/or the file database. In another embodiment, the search engine may also retrieve copies from the Internet.

The search engine 226 may present, through the community server 202, the results to the user. In one embodiment, if the user is satisfied with the search results the user may stop the search process. In another embodiment, if the user would like to perform further searching the user selects one or more of the search results and asks the search engine 226 to continue searching. In one embodiment, the user may have provided an image that was close to but not exactly the image for which the user was searching. Therefore, a user may wish to use the search engine through several iterations the user may need to use the search engine through several iterations before finding the results desire finding the desired results.

In one embodiment, a user may mix or aggregate content in a compilation or "remix." This compilation (which should be understood both in the copyright and non-copyright senses of the word) may be governed by rights of the user and rights of the publisher(s) of the content from which it is composed. The user may have obtained the content for the compilation by interfacing with the community server 202, by retrieving files from another source, or by creating the content himself. When the digital marketplace encounters this compilation, the digital marketplace may send a request to the identification engine to create one or more bit prints for the compilation, send a request to the cataloging engine to catalog the bit prints, and send a request to the arbitration engine to determine the ownership of the rights to the content in the compilation.

In one embodiment, the community server 202 includes a subscription engine 236. The subscription engine 236 provides users with access to content file on a subscription basis (e.g., paying for a month of unlimited access to a group of content files). The subscription engine 236 may access the ratings database 240 and the meta-graphics database 242 to determine content files to include in subscriptions. In one embodiment, the subscription engine 236 selects a group of content files that it deems "head content" and the subscription engine includes the group of content files initially in a subscription grouping. In another embodiment, the subscription engine 236 adds content files that the subscription engine deems "tail content" to the subscription grouping. "Head content" refers to popular content with a large audience and presumably high demand, whereas "tail content" refers to content which, while possibly able to be sold, is in low demand. In one embodiment, the subscription engine 236 includes the tail content based on information about the tail content contained in the ratings database 240 and/or the meta-graphics database 242. In one embodiment, tail content may be included by the subscription engine 236 based on a popularity rank in the ratings database 240 and/or the meta-graphics database 242. In another embodiment, tail content may be included by the subscription engine 236 based on a particular correlation between the tail content and the head content contained in the subscription grouping. For example, if the particular item of tail content is reviewed very highly by users who are subscribers to the subscription, the subscription engine may include that piece of tail content or similar pieces of tail content in the subscription.

In one embodiment, the community server 202 includes a pricing engine 234. The pricing engine 234 provides guidance to a user on prices for rights in content files. In one embodiment, the pricing engine 234 provides a user with suggestions of prices, or a range of prices (e.g., pricing buckets) to charge for rights that the user wishes to sell or license in a content file. In another embodiment, the pricing engine 234 provides a user with prices or a range of prices for rights that the user wants to acquire in a content file. In yet another embodiment, the pricing engine 234 provides negotiation support between users in negotiating a price for rights in a content file.

In one embodiment, the pricing engine 234 may include results from previous sales of rights in similar content files as determined by communicating with the cataloging engine to determine what constitutes a similar file, and the brokering engine 230 to determine recent prices. In another embodiment, the pricing engine 234 may interface with the community server 202 to determine a "live auction" price from other users. In yet another embodiment, the live auction may be performed with users who determine prices for content files but are not interested in purchasing rights in the particular content file for which pricing guidance is sought from the pricing engine 234 by a user. In yet another embodiment, the pricing engine 234 may include publishing information relating to the user requesting pricing guidance from the pricing engine. For example, the user's default prices may be considered by the pricing engine 234 so as not to provide guidance that is too different than what that user believes rights in his content file are worth. In one embodiment, the pricing engine 234 may also accept information about the cost of producing the content file in providing pricing guidance. In another embodiment, the pricing engine 234 may include network conditions (e.g., demand, the time of day) and prevalent pricing structures (including comparable files, and comparable content file groupings) known to the digital marketplace in the pricing guidance the pricing engine provides a user. In yet another embodiment, the pricing engine 234 may take into account the history of success and/or ratings received on previous content files from the same publisher in providing pricing guidance.

In one embodiment, the community server 202 includes a brokering engine 230. The brokering engine 230 moderates negotiations between users in determining and transferring rights in content files. The brokering engine 230 may receive information from the arbitration engine relating to rights owned in content files according to information known to the digital marketplace. The brokering engine 230 may obtain new information relating to the ownership of rights in a content file and may combine it with the information previously known to the digital marketplace. For example, a user may provide the brokering engine 230 with proof that he created a particular content file which the brokering engine 230 may then store. The brokering engine 230 may also be able to contact a user who has previously expressed interest in purchasing rights in a content file, and offer rights to that content file. The brokering engine 230 may submit information about the content file to the arbitration engine and/or the cataloging engine and may request information about the content file. In order to generate a price, the brokering engine 230 may request information from both the ratings database 240 and the meta-graphics database 242, such as information relating to similar files to the content file being brokered. The brokering engine 230 may also receive pricing guidance from the pricing engine.

In one embodiment, the community server 202 includes an accounting engine 246. The accounting engine 246 keeps track of licenses, royalties, usages, and violations of rights in content files. In one embodiment, the accounting engine 246 communicates with the cataloging engine and the arbitration engine to determine usages of content files on a public network, such as the Internet. The accounting engine 246 may monitor usage of a particular content file in order to calculate royalties due to a publisher based on a license of that content file. In another embodiment, the accounting engine 246 may become aware of violations of licenses, or other unlicensed uses a content file. In one embodiment, the accounting engine 246 may contact a publisher (e.g., a user who owns rights in the content file) to report uses of the content file encountered by the digital marketplace. For example, the accounting engine 246 may notify publishers that a content file in which they own rights is being misused. In another embodiment, the accounting engine 246 may collect royalties for the licensed use of a content file, notify the publisher of the extent of the use of the content file, and deposit the royalties into the publisher's account. In this manner, the community server may provide a "turn-key" service for monitoring use of a content file under a license and collecting royalties for that use on behalf of a publisher.

In one embodiment, the accounting engine 246 provides a licensing clearinghouse for a user interested in licensing multiple content files or rights to use the multiple content files. In another embodiment, the accounting engine 246 provides the clearinghouse functionality by interfacing with the cataloging engine to determine all the bit prints necessary for licensing (e.g., all of the bit prints related to the bit print(s) of the content file desired), and interfaces with the arbitration engine to determine the owners of rights in those content files (and/or bit prints). Therefore, a user interested in obtaining rights to one or more content files, after that user has determined which content file he is interested in, and brokered transactions with the publishers (e.g., rights owners) to those content file may set up a turn-key solution with the accounting engine 246.

As one example, a user wishing to secure rights to create a derivative work, such as a re-edited version of a popular TV show may broker a deal for those rights with the brokering engine 230. The user may then request the accounting engine 246 to implement that deal. For example, a user, under the terms of the license, may sell "per view" uses of that re-edited show and may use the accounting engine 246 to distribute royalties to all the rights owners in the re-edited show. The accounting engine 246 would then monitor the use of the re-edited show (e.g., the sales of "per view" uses), and calculate the royalties due. The accounting engine 246 then deducts from the user's account those royalties, and sends payments to all the rights owners of the content used in the re-edited show.

In one embodiment, the community server 202 includes a repackaging engine 220. The repackaging engine 220 creates copies of content files formatted for users and/or for specific purposes. In one embodiment, the repackaging engine 220 includes an advertisement inserter 222 and a digital rights management (DRM) engine 224. In one embodiment, the repackaging engine 220 provides users who have purchased rights in a content file the ability to access those rights regardless of the platform in which the user wants to access those rights. For example, a user may wish to view a video on his computer, and may request the repackaging engine 220 to format the video for viewing on his computer. However, that same user may wish at a later time to view the same movie on a handheld digital media player. At that time the user may ask the repackaging engine 220 to repackage the movie and/or provide him with a copy of the movie appropriate for playing in a handheld media player. In another embodiment, the repackaging engine 220 provides a user an opportunity to receive another copy of the content file, after the user has lost the content file, for example, as a result of a hard drive crash. In one embodiment, the repackaging engine 220 is in communication with entities such as the brokering engine 230, the accounting engine 246, the cataloging engine, and/or the arbitration engine in order to determine whether a request by a user to receive a file again complies with the rights owned by that user in that file. For example, a user may only own rights in a particular file for use with a particular piece of hardware. In another example, a user may own rights in a file only for one time use.

In one embodiment, the repackaging engine 220 includes an advertisement inserter 222. The advertisement inserter 222 may repackage a content file to include advertisements. In one embodiment, the advertisement inserter 222 includes advertisements in a content file based on information from the brokering engine 230 about a negotiation between a user and a publisher. In another embodiment, a user may agree to receive rights in a content file (e.g., rights to view the content file) under the condition that the content file will include advertisements. In one embodiment, as consideration for viewing the content file including the advertisements, the publisher agrees to receive a lower price for the rights in the content file from the user. In another embodiment, the brokering engine 230 also negotiates with a publisher of the advertisements, and secures payment from that publisher based on the advertisements included in the content file, and presumably viewed by the user. In yet another embodiment, the accounting engine 246 collects royalties from the publisher of the advertisements when and if the user accesses (e.g., views, downloads) the content file including advertisements. In one embodiment, the accounting engine 246 makes a deposit in the account of the publisher of the content file, the deposit including payments from the user and the publisher of the advertisements. In another embodiment, the repackaging engine 220 may provide at the request of the brokering engine 230 a content file that is available completely royalty-free to a user based on the advertisements contained therein.

In another embodiment, the repackaging engine 220 includes a digital rights management (DRM) engine 224. The DRM engine 224 resolves DRM software issues for users and publishers (e.g., users who own rights in content files). In one embodiment, the DRM engine 224 creates files for users formatted to allow access to the file in multiple DRM environments. For example, a user who purchases rights in a content file may anticipate using those rights within a particular DRM environment, however, the user may wish to use the content file (e.g., view a video, listen a song, print a report) in another DRM environment. In one embodiment, the user may contact the repackaging engine 220 and request that the content be repackaged to fit this new DRM environment. In another embodiment, based on the rights owned by the user in the content file, a DRM engine 224 will repackage the content file, including the DRM portion of that file and returned to the user. In one embodiment, the digital marketplace may develop and use a proprietary DRM system (which may be DRM software) in addition to DRM systems used by content players. In another embodiment, the digital marketplace may use a proprietary DRM system (which may be DRM software) to control access to files created within the digital marketplace. In yet another embodiment, the digital marketplace integrates the proprietary DRM system (which may be DRM software) with the identification engine's function of assigning a bit print to a content file. As used herein, the term proprietary DRM system should be understood to mean that the system is designed by the digital marketplace, not necessarily that the DRM system is not used by or shared with third parties.

Figure 3:
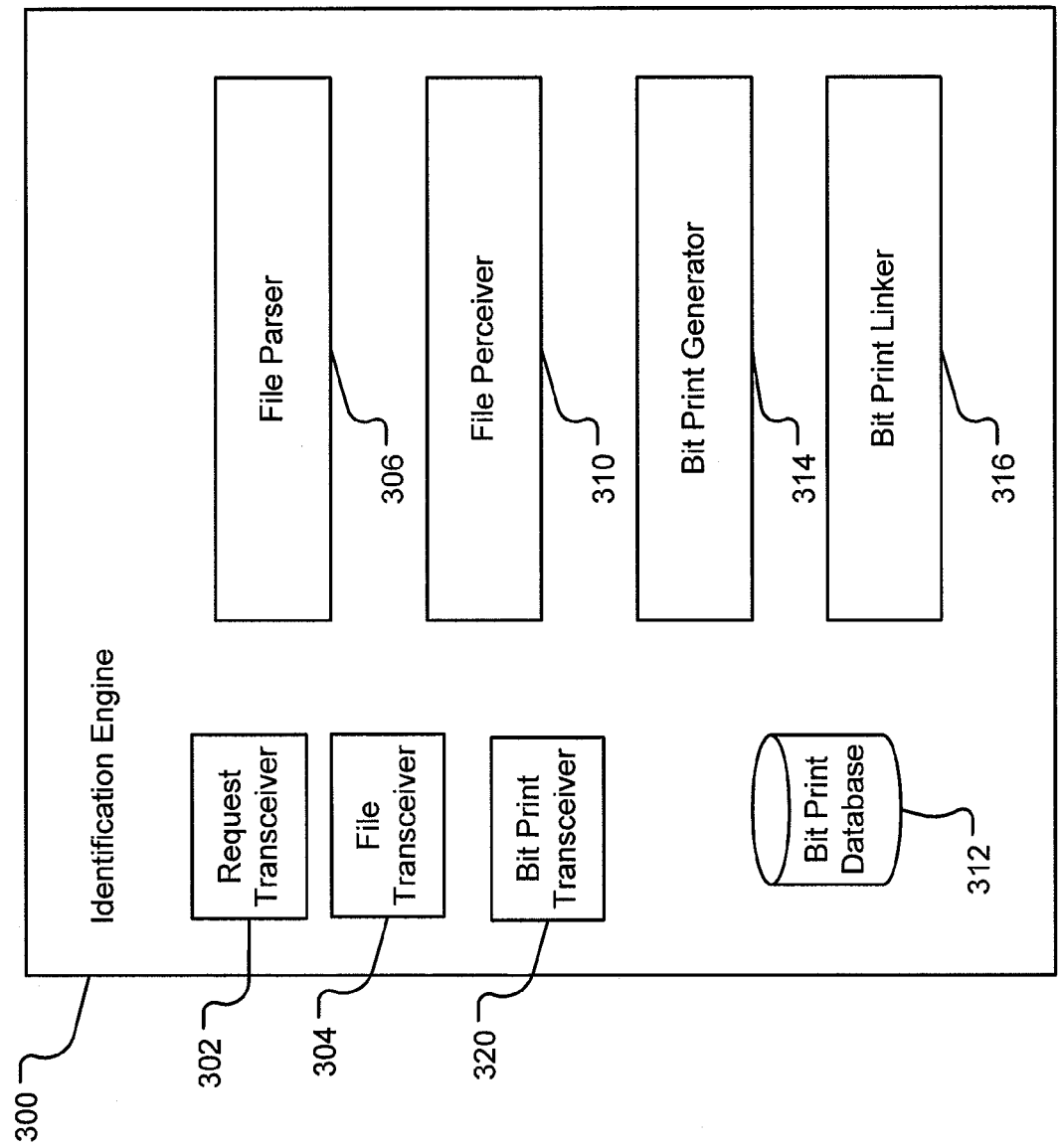
FIG. 3 illustrates an embodiment of an identification engine.

FIG. 3 illustrates an embodiment of an identification engine 300. The identification engine 300 can create a unique identifier for each file encountered by the digital marketplace. The embodiment of the identification engine 300 shown comprises a request transceiver 302, a file transceiver 304, a file parser 306, a file perceiver 310, a bit print database 312, a bit print generator 314, a bit print linker 316, and a bit print transceiver 320. The embodiment of the identification 300 engine shown may be distributed over a number of physically distinct systems. The embodiment is described here as a unit but is not meant to limit the identification engine 300 to the embodiment shown.

The request transceiver 302 receives requests for determining an identification or bit print of a file, parts of a file, or authentication requests. For example, a crawler may want the identification engine 300 to determine a bit print for a file that was found on a network while crawling the network, or a user may wish to identify a file of unknown origin. The request may be made for the file to be identified so that the file may be matched to a known file, whose rights are known. The request may also be made to populate a file database.

The file transceiver 304 receives files from a source that may be within the digital marketplace or outside of the digital marketplace. In one embodiment, the file may be contained in a file database within the digital marketplace (e.g., 120). In another embodiment, the file may be stored on a remotely located machine (e.g., server 130) accessible via a network. In yet another embodiment, the file may be stored in the file transceiver 304. The file transceiver 304 makes available the received file to the file parser 306 and the file perceiver 310.

The term file, as used herein, can be any type of file, comprising any type of information/content, such as media, audio, .html file, .pdf of a report, access to webpage, assets (e.g., gold and swords) in a video game, or a password stored in an ASCII format. A file may include software code, (e.g., source code, compiled format) or any machine readable instructions. The identification engine 300 can create a bit print out of a non-digital asset or another right, which may be expressed in electronic form, for example, the right to attend a baseball game, or an entry in a lottery or raffle. Therefore, a file may include an electronic representation of a right, such as a contract right. As used herein the term "content file" should be understood as coextensive with the term file, and the use of either term should not be more limited than the use of the other.

The file parser 306 parses a file based on a received request. The file parser 306 parses a file in order to prepare for bit print generation for the file. To that end, the file parser 306 may extract data relating to the file in order to pass that data to the bit print generator 314. For example, the file parser 306 may determine attributes of the file, including the format of the file (such as represented by an extension of the file e.g., .jpg, .html, .pdf) and any metadata associated with the file. In one embodiment, the file parser 306 may detect a machine readable right (MRR) associated with the file. For example, a MRR associated with the file may be a creative commons license limiting the use of the file. In another embodiment, the file parser 306 may also detect elements within the file that may be related to known bit prints. For example, the file may have elements of other files that have bit prints (either for the other files or for those elements).

For example, a bit print may represent only a portion of a file. In one embodiment, a bit print of a portion of a file may identify just the portion of the file. In another embodiment, a bit print of a portion of a file may identify the entire file. For example, a particularly distinct or identifiable section of a file (e.g., a climactic scene or the image of an actor's face in a movie) may be used to identify the entire file. In one embodiment, a portion of the file chosen to carry a bit print identifying the entire file is chosen at random. In another embodiment, a portion of a file is chosen based on an attribute of the portion of the file. For example, it may be necessary only to create a bit print for every $30^{th}$ frame of a movie, or the center section of a photo, based on type of content in the file. In one embodiment, a portion is chosen based on the size of the file.

The file perceiver 310 may create several altered formats of the file to pass to the bit print generator 314 to aid in the creation of a bit print for the file, and for any elements contained in the file. The altered format may be perceptible by a human, such as through viewing an image or a movie, or through listening to a music file (e.g., decoding an .MP3 file into an audio waveform). In another embodiment, the altered format may be a digital format which is not perceptible by a human. For example, the file in an original format may be in an AVI format, and the file in the altered format may be in an MPG format. In another embodiment, the file in the altered format may be resized and/or re-sampled to compare it with other files. In another embodiment, the altered format may be a format that is not perceivable through an industry standard format, but is, however, useful to the file perceiver 310. For example, the file perceiver 310 may convert a music file or an image file into a histogram, or may create a two-dimensional Fourier transform of an image in order to compare an image to another image.

The file parser 306 and file perceiver 310, working in combination, may provide the bit print generator 314 with a group of files which have been created from the file received by the identification engine 300. In one embodiment, the file perceiver 310 and/or file parser 306 may separate a content file into elements based on perceptual cues of the content file in order to create bit prints for the elements. For example, a bass line of a song may be an element for which the bit print generator creates a bit print separately from a drum beat. The file perceiver 310 may aid the bit print generator in determining elements for which separate bit prints should be created, and may also aid the bit print generator in separating the content file into elements for the creation of bit prints for those elements.

Any files and elements of files are then passed to the bit print generator 314 for creation of the bit prints related from the files and elements. The original file may be included in the group of files passed to the bit print generator 314. A generated bit print is returned by the bit print generator 314 and may be stored in the identification engine's bit print database 312 and linked with other bit prints returned from the bit print generator.

The bit print linker 316 performs the linking function. In one embodiment the bit print linker 316 only links bit prints which are based on related files (e.g., files which were passed to the bit print generator as part of a group of files). In another embodiment, the bit print linker 316 links bit prints of unrelated files. The bit print linker and its function will be discussed further with respect to FIG. 6.

Figure 4:
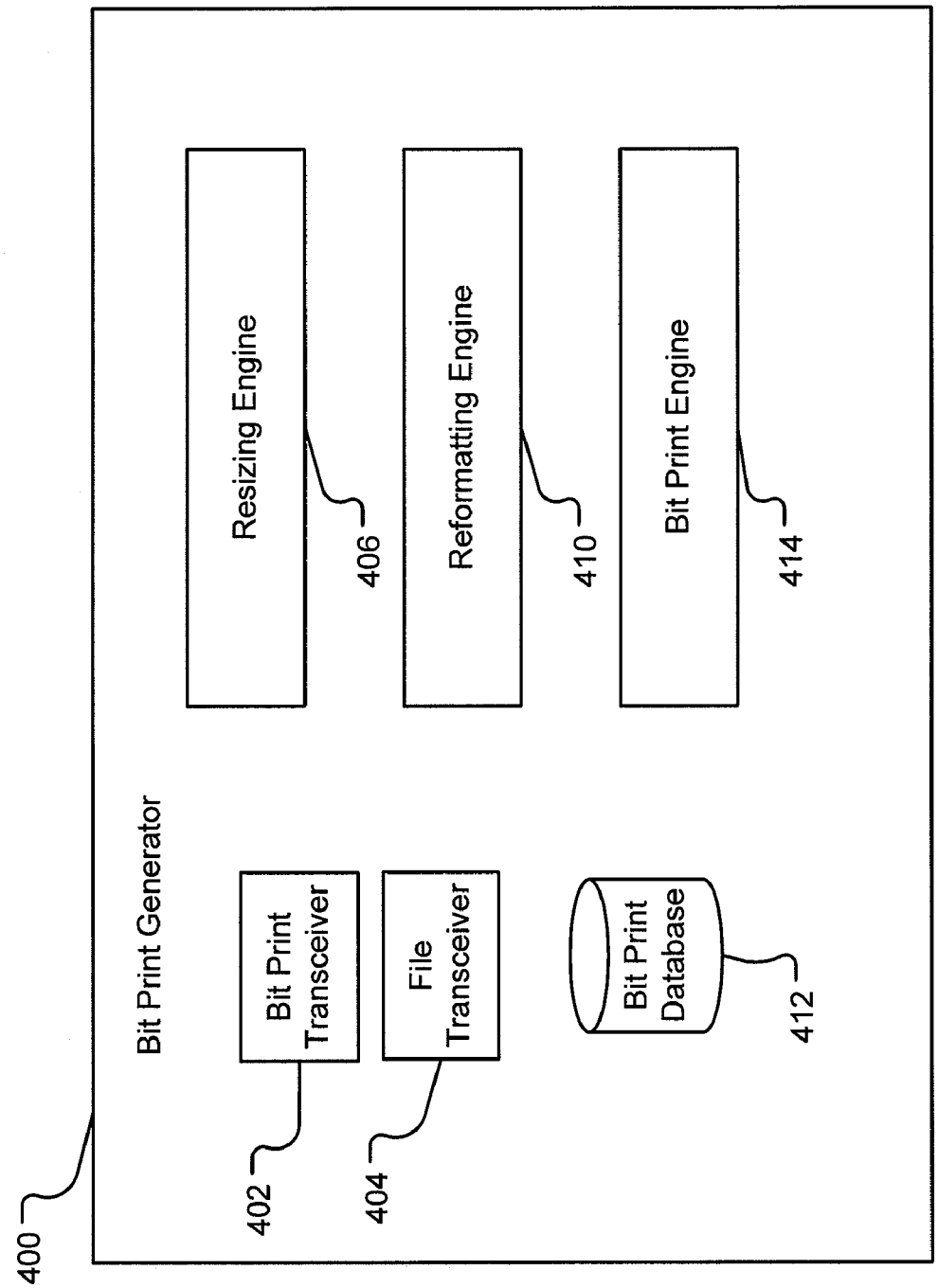
FIG. 4 illustrates an embodiment of a bit print generator.

FIG. 4 illustrates an embodiment of a bit print generator 400. The embodiment of a bit print generator 400 includes a bit print transceiver 402, a file transceiver 404, a resizing engine 406, a reformatting engine 410, a bit print database 412 and a bit print engine 414. The resizing engine 406 and reformatting engine 410 may provide other files than the file received by the identification engine or the altered format files created by the file perceiver, based on the requirements of the bit print engine 414 and the bit print database 412. For example, the bit print engine 414 may request another file be created in a different format from the resizing engine 406 or the reformatting engine 410. This requirement may be made by the bit print engine, for example, when it encounters a part of the bit print creation for which a different size or format of the file would be useful.

In the embodiment shown, the bit print generator 400 may create a bit print based on the received file, the altered formats of the received file from the file perceiver, the resizing engine 406, or the reformatting engine 410 (e.g., the received file as transformed into different formats, thereby comprising a set of files each with an altered format). The bit print generator 400 may also use information received from the file parser about the received file.

In one embodiment, the bit print database 412 may be used for temporary storage of bit prints as they are created, compared, and grouped for transmission. In another embodiment, the bit print database 412 may store bit prints on a somewhat permanent basis for reference or other use in creating bit prints.

As will be appreciated, a bit print generator 400 may adapt to and account for the various ways in which a content file may be formatted or manipulated without changing significantly the ability to perceive or use the underlying information. Many rights inherent to content inure in the perception or use of that content, not in the format of the content (i.e., the actual arrangement of bits constituting a particular file). For example, a patented process may be performed by two computer software programs that are entirely different because they were compiled at different times. Another example is a piece of music represented by two files that have different sampling rates. The different sampling rates create different files, but the underlying music is similar and protected by the same rights. The bit print generator 400 may, therefore, adapt the process of generating the bit print to fit a type of content file and/or to respond to a type of modification that masks the identity of a content file, yet still violates (or allows violation of) the rights in the underlying use or perception of the content. For example, a bit print for a music file may use frequencies, histograms, and waveform analyses, while a bit print for an image file may use correlations, two dimensional Fourier transforms, resizing and run-length coding analyses. In short, any manner of processing of the content file may be used by the bit print generator 400 in creating the bit print for the content file. In one embodiment, the processing may be performed by the file perceiver, the bit print generator 400, or any combination of the two.

Because the creation of a bit print may render different bit prints for different files, even though the files are perceived in a similar fashion by a user, matching a bit print to another bit print should be considered an inexact process. In other words, matching a bit print to another bit print may be done to some threshold of similarity, with matching bit prints being considered bit prints which are matched only to some threshold or level of exactness.

In one embodiment, a bit print generator 400 may create many bit prints for each content file. These bit prints may each be associated with an element of the content file, identifying an element in the content file that may be used (and then later identified) as an element in another content file. In one embodiment, the bit prints for each element may track parts of the larger file, or master file, parts which may be included in derivative content files or "remixes" of the larger content file. In another embodiment, to the extent that the owner(s) of rights in a larger content file has rights in the constituent elements of the content file, the bit prints for each element may help track, control and market the rights in those elements. For example, the bit print generator 400 may identify still images inside a movie file, and may give each of those images its own bit print. In one embodiment, the bit print generator 400 may also give the movie file its own bit print. In another embodiment, the bit print generator 400, therefore, may create several bit prints from one content file.

In one embodiment, the bit prints created by the bit print generator 400 from the content file may include bit prints similar or equal to bit prints already known to the digital marketplace. In another embodiment, the bit prints identified for the elements of a content file may also include elements that are not known to the digital marketplace.

Bit prints may include time codes, such as codes showing when particular elements appear in a content file. For example, the bit print for a content file may include a time code and reference for each element of the content file, along with a representation of the perception of the content file as a whole. In one embodiment, the bit print of the content file represents the content file as a whole as well as the ordering of and reference to the elements comprising the content file. In another embodiment, the bit print for the content file may be associated via links to the bit prints for the elements and the links may include time codes.

Figure 5:
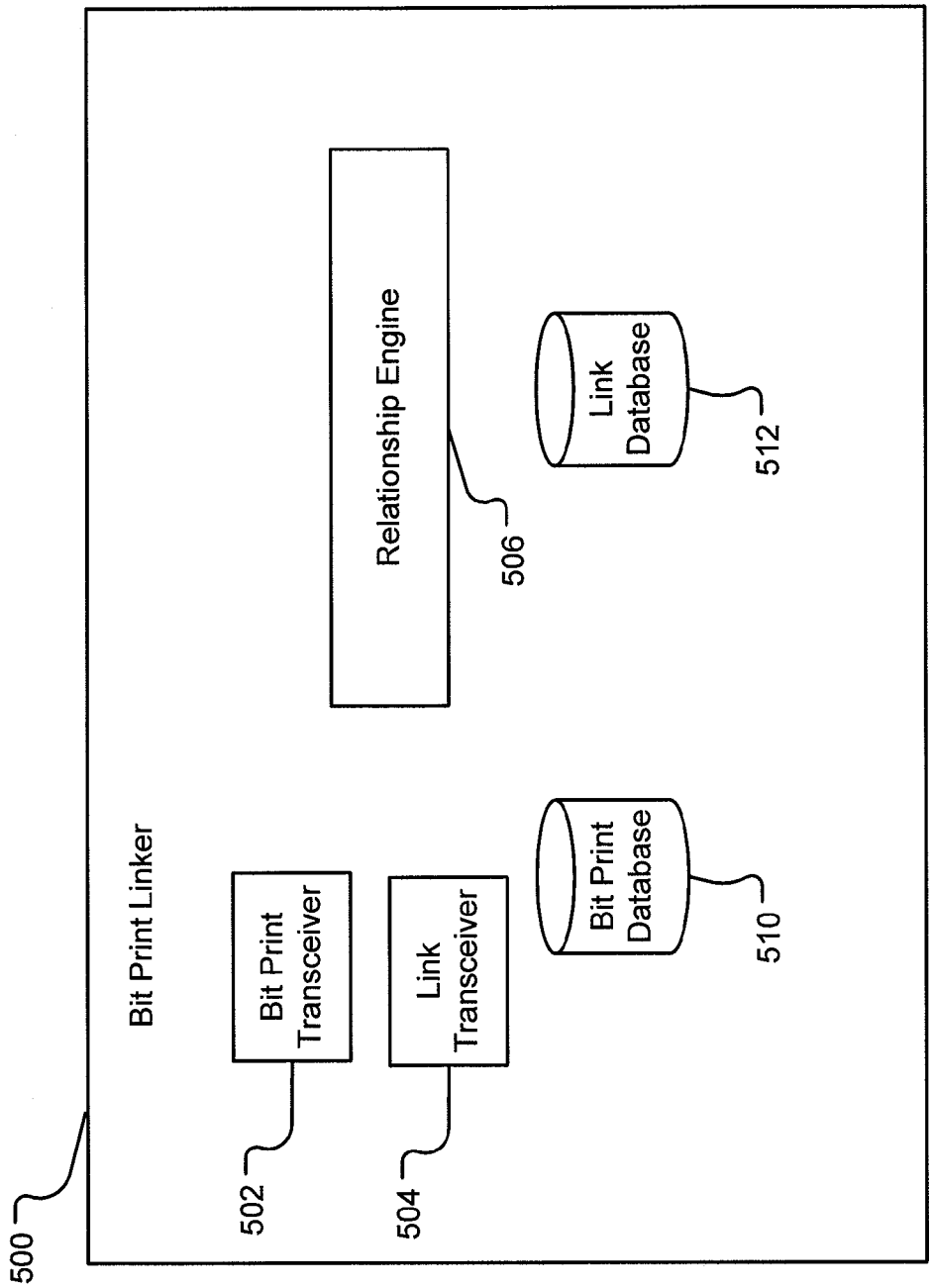
FIG. 5 illustrates an embodiment of a bit print linker.

FIG. 5 illustrates an embodiment of a bit print linker 500. The embodiment of the bit print linker 500 shown comprises a bit print transceiver 502, a link transceiver 504, a link database 512, a bit print database 510, and a relationship engine 506. In one embodiment, the relationship engine 506 performs a function of determining the relationship of at least two bit prints to each other, such as by comparing the bit prints to identify similarities. In another example, the relationship engine 506 may create links between bit prints based on the determination of the relationship between the bit prints.

As used herein, the term "link" refers to a computer-recognizable description of how two media files are related. As used herein, the term "relationship" refers to a hierarchy, tree, lineage, dependency, genealogy, co-ownership or other connection between bit prints and/or the files the bit prints represent. A link may be generated from two media files or from bit prints representing those files. Therefore, a link may describe a relationship between two or more bit prints. In one embodiment, one bit print is determined to match another bit print if there exists a link describing the two bit prints as significantly related. Also, a link may describe a relationship between two or more files. A link may be a part of the bit print, or a part of the content file's metadata that describes relationships with other bit print(s). The description of bit prints herein has shown how bit prints may be contained within another bit print, and how a relationship between the bit prints may inherently be expressed through this structure. It should be understood that this structure may also comprise a link because the structure inherently describes at least one relationship between the bit prints contained in the structure. A link may be stored in a linking document, a document created and stored to describe the relationship between files and/or bit prints. Links or linking documents may be stored separately from bit prints, for example in a link database.

One example of how a media file might be related to another media file is an image which appears inside another image. For example, a picture may be hanging on a wall in the background of another picture. The picture on the wall therefore appears inside the larger picture. An image may also appear inside a video (e.g., the picture on the wall may be in several frames of the video file as the video shows a scene in the room). A link may be created to show that there is a relationship between the picture on the wall and the other file, the video file or the other image, and the link may include the nature of the relationship, the various times when each file was presented on a publicly accessible network, and who purportedly owns each file.

Another example of how a media file an audio file may be "sampled" or otherwise used in another music file. It is common practice for contemporary musicians to use other audio segments in their music. Therefore, a piece of music may appear in another piece of music created by another person. A piece of music may be used in many music files, such as a very popular drum solo (e.g., the "Amen break" is commonly used in hip-hop and dance music), and therefore there may be many relationships between a file and other files. A link or linking document may be adapted to particular situations to make the link or linking document easier to search. For example, a linking document may be created for a popular sample of music which contains all of the uses of the sample known to the digital marketplace. Alternatively, a linking document or link may be created for each use of a sample of music, and the linking documents or links may be stored in a searchable link database.

In one embodiment, the relationship engine 506 may determine that one bit print represents an element of a content file represented by another bit print. For example, the relationship engine 506 may link two bit prints describing their relationship as that of a content file and an element contained in the content file. In one embodiment, bit prints include links to one another, such as a link that describes "this first bit print is part of this second bit print" or a link that describes "this first bit print comprises this second bit print, this third bit print, and this fourth bit print." In one embodiment, links describe a relation of the content files (or elements of the content files) they represent, and may not necessarily describe a relation between the bit prints themselves. In one embodiment, a bit print generator may pass related bit prints to the bit print linker 500 for linking or association with each other. In another embodiment, the relationships or links between bit prints may be stored in a database such as the link database 512 in the bit print linker 500, or in another part of the digital marketplace, such as the community server.

In one embodiment, the relationship engine 506 creates links based on bit prints from the bit print generator. In this embodiment, the bit print generator determines associations between the bit prints and transmits the associations to the bit print linker 500, which would create links between those bit prints and transmit those links to a cataloging engine. In one embodiment, links may be stored and maintained by the cataloging engine.

In one embodiment, the relationship engine 506 creates hierarchies or trees of bit prints and transmits them to the cataloging engine for storage and organization. In this embodiment, the cataloging engine may identify cross-references between these hierarchies or trees of bit prints and store the bit prints in any appropriate manner.

In another embodiment, a bit print may be constructed in such a manner that its relationship with other bit prints is contained inherently in the bit print itself. For example, a correlation operation (such as a two dimensional optical correlation) may contain elements that may be identified by searching for them individually. In one embodiment, a bit print comprises all of the bit prints of the elements within it, so that an entity trying to find a particular element within the content file only needs to look at the content file's bit print to see if the element is within the content file. An example would be a song's bit print that comprises a list of representations of pitches and rhythms. In this example, a bit print of an element of another song may include a few pitches and their related rhythms. An entity (e.g., an arbitration engine) trying to determine if an element exists in the song may match the element's bit print against parts of the song's bit print to see if there is a match. Other pattern matching techniques could also be used to match bit prints as well.

In one embodiment, the bit print linker 500 and particularly the relationship engine 506 create links from these inherently-contained relationships. These links may be stored and transmitted to a cataloging engine. The cataloging engine may then use the links to index the bit prints for search and/or retrieval. In one embodiment, a bit print that contains inherent relationship information or contains other bit prints (as described above) may still have a link or links created for it by the relationship engine 506 and transmitted to the cataloging engine to aid in searching, correlation, and/or retrieval of some or all of its related bit prints. In another embodiment, a larger bit which contains inherent relationship information or other bit prints may be divided by the relationship engine into a group of bit prints, with each bit print of the group representing an element of the larger bit print.

In one embodiment, the bit print linker 500 may also designate bit prints as clones or ghosts of one another. Two similar content files may have the same bit print generated by the bit print generator or may have similar bit prints. These similar but not identical bit prints may be associated as clones or ghosts of one another. For example, a first bit print may be related enough to a second bit print to associate them as ghosts or clones of each other. The designation or association of bit prints as clones or ghosts may also be performed by the arbitration engine, as discussed further herein. In one embodiment, bit prints that are clones or ghosts of each other may represent similar content files, or content files that may be perceived similarly. Thus, content files that are similar but are assigned different bit prints may be associated and/or designated as having similar perceptions. In another embodiment, the clone or ghost designation may represent that there are similar rights in the content files represented by the bit prints. In one embodiment, a bit print may be a clone or a ghost of another bit print, regardless of whether the bit print represents an entire file or an element of a file.

In one embodiment, a bit print may be re-created or "recast" after it has been created. The decision to re-create a bit print may be made on the basis of a conflict of ownership or a dispute about the identity of a content file or element within a file. In one embodiment, the re-creation can also be based on human-perceived similarities between two files. For example, a user might submit two files and assert that they are similar or derivatives of each other. In one embodiment, re-creations or re-castings may be focused only on an element of the file. In another embodiment, the original bit print and the recast bit print may be stored. In another embodiment, the original bit print and the recast bit print may be associated with one another, including as ghosts or clones.

Figure 6:
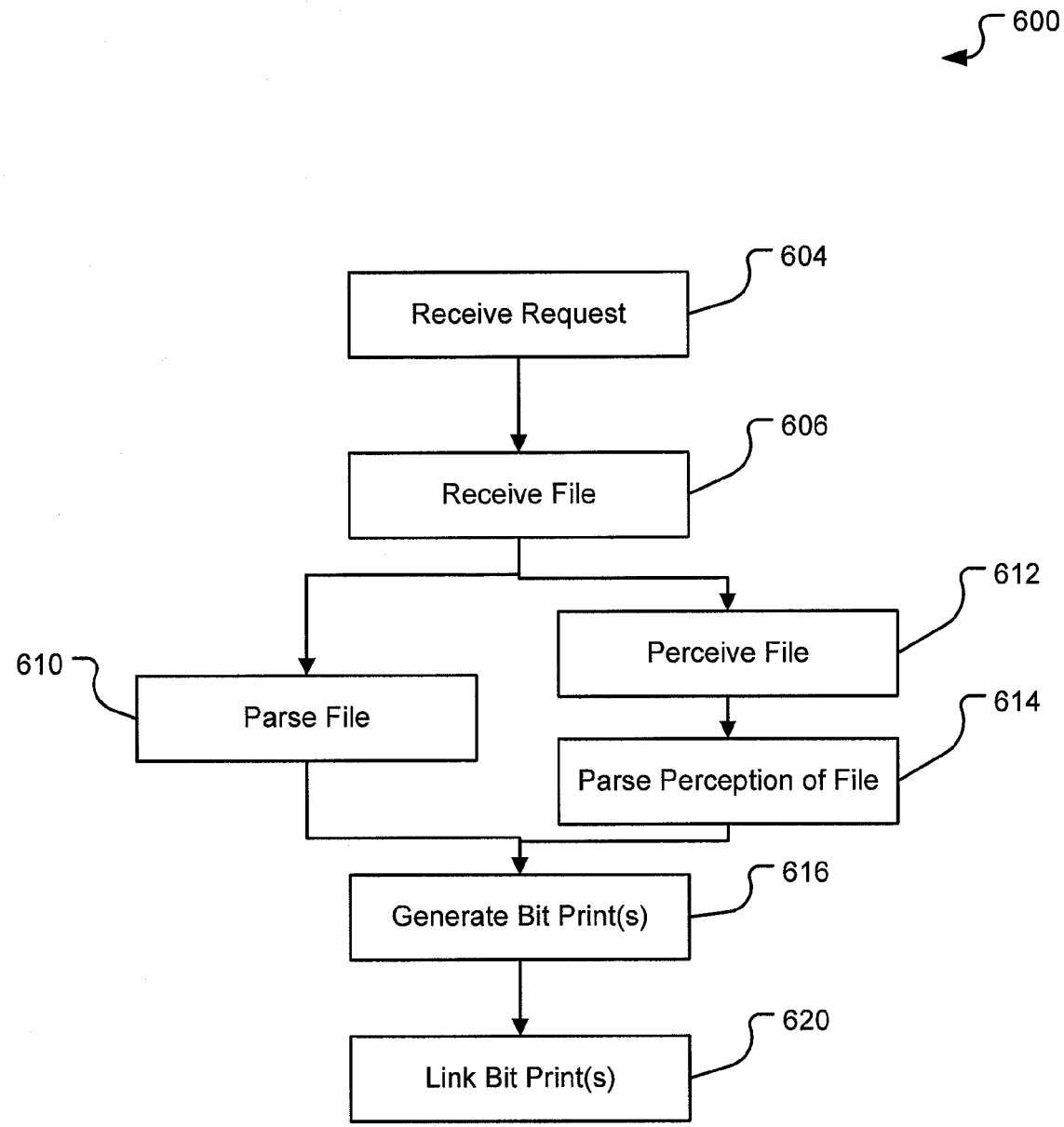
FIG. 6 illustrates an embodiment of a process for creating a bit print from a file.

FIG. 6 illustrates an embodiment of a process 600 for creating a bit print from a file. In one embodiment, a file is located 602 automatically or otherwise without a request received to create a bit print from that file. In this embodiment, the file may be unknown to the digital marketplace when it is located, and the process 600 of creation of a bit print may begin on the file, even though the file may be of dubious significance to the digital marketplace at that time. In this mode, the process 600 may build an authoritative catalog of files which are used on a publicly accessible network.

The file may be retrieved from its location where it was located 608. In one embodiment, the file may be located 602 without simultaneously retrieving the file 608. For example, a file may be located 602 by name and location alone, and the content of the file may not be retrieved 608 until another time (e.g., until after a determination has been made that the file is pertinent to be cataloged by the digital marketplace). In another embodiment, the locating of the file 602 includes retrieving the file and so retrieving the file is not required as a separate operation. Retrieving a file 608 may be performed through downloading or otherwise accessing the file.

In another embodiment, a request is received 604 for generating at least one bit print from a file. In one embodiment, the file is received 606. In another embodiment, a reference to a location of the file is received. For example, a location of a file may be received and then the file may be retrieved, downloaded or otherwise accessed from that location.

When a file is either received 606 or retrieved 608 it may then be processed. In one embodiment, the file may be parsed 610 as described herein. In another embodiment, the original file is perceived 612, rendered and/or formatted as described herein. The resulting file(s) may then be parsed 614, also as described herein. The results of the parsing 610, 614 and perceiving 612, as well as the results of the first parsing of the original file, are used to generate 616 at least one bit print. The resulting bit print(s) may be linked 620 as described above, and at least one of the bit print(s) may be stored 622 (e.g., in a bit print database). This process 600 is meant as an example of a process for performing some of the functions described herein, and is not meant to limit the system or methods described herein for providing a digital marketplace.

In one embodiment, the transformation used for bit print generation 616 may be selected based on the type of content of the file, or based on how the content of the file is perceived. For example, effectively identifying and/or cataloging content which is perceived multi-dimensionally may require identification techniques which are also multi-dimensional. In one embodiment, a multi-dimensional transformation (e.g., a 2-dimensional Fourier transform) may be used to generate a bit print 616 for a file containing multi-dimensional content, such as an image or video file. In another embodiment, a linear transformation may be used for a file with linear content. For example, an audio file may be perceived 612 in a linear manner such that a section of the audio may be perceived (e.g., listened to), identified by a bit print and cataloged separately from the surrounding sections of audio. Therefore, sections of audio may be separately identified or the whole audio file may be identified by a combination of the separately identified sections of the audio file.

Figure 7:
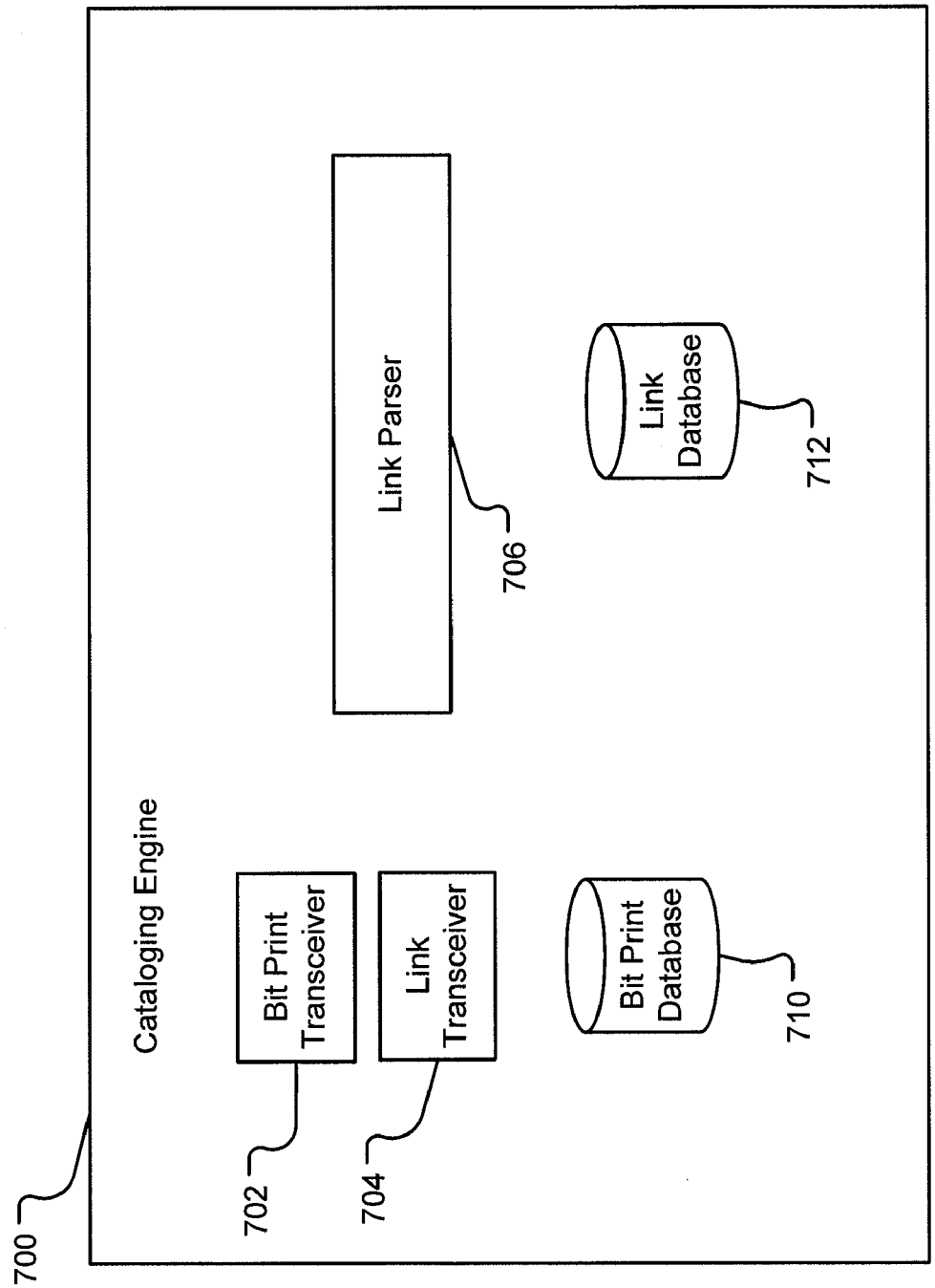
FIG. 7 illustrates an embodiment of a cataloging engine.

FIG. 7 illustrates an embodiment of a cataloging engine 700. The cataloging engine 700 comprises a bit print transceiver 702, a link transceiver 704, a bit print database 710, a link database 712, and a link parser 706. The cataloging engine 700 may perform the function in the digital marketplace of storing and maintaining a catalog of bit prints and links (e.g., through databases 710, 712) relating to files encountered by the digital marketplace, for example, files that are accessible or available on public or private networks. The cataloging engine 700 receives bit prints relating to files. In another embodiment, the cataloging engine 700 may receive bit prints and the content files associated with those bit prints. In one embodiment, the cataloging engine 700 catalogs the bit prints to provide the digital marketplace with the ability to distinguish between content files that are copies (or transformations) of other content files and content files that are distinct from other content files. For example, the cataloging engine 700 may provide a means of efficiently searching and retrieving bit prints. In one embodiment, the cataloging engine 700 performs this function by maintaining a bit print database 710 and a link database 712.

The bit prints stored by the cataloging engine 700 and their links may be passed to the arbitration engine in order to resolve any conflicts or to clarify any ownership or identity issues relating to the new bit print and the bit prints known by the digital marketplace. Bit prints known by the digital marketplace may include bit prints stored in the bit print databases of the identification engine, the cataloging engine 700, the arbitration engine, or otherwise known to exist by the digital marketplace (e.g., in content file database).

As described above, bit prints may also include links or may have linking information encoded into the format of the bit print. In one embodiment, the link parser 706 examines links and linking information to aid the organization of the bit print database 710 and the link database 712 to provide the digital marketplace the ability to reference a new bit print against bit prints known by the digital marketplace. The new bit print may be created from a content file encountered by the digital marketplace or may be created from a copy or transformation of a content file stored in the digital marketplace. There are many functions described herein which the cataloging engine 700 may provide and the link parser 706 may be adapted to suit the functions of the cataloging engine through the link parser's various processes of examination, hashing, and parsing of links.

In one embodiment, the cataloging engine 700 receives bit print(s) relating to a content file whenever the digital marketplace encounters a content file. The digital marketplace may encounter files under a number of circumstances. For example, the digital marketplace may find files whose rights are not claimed by anyone, except, presumptively, the owner or promoter of the site where the file was found. The digital marketplace may also receive a file from a publisher (or putative publisher) and may generate bit print from that file. This may be a "master" bit print if the publisher claims to have created the work. This master status may be contingent upon checking against other bit prints determined to have already have existed when the (putative) publisher submitted the file to the digital marketplace.

In one embodiment, the cataloging engine 700 may receive identifications of content files encountered by a crawler. In one embodiment, the cataloging engine 700 may build a record for a new and/or unknown content file by designating a history related to that content file. In one embodiment, the cataloging engine 700 creates a history for each bit print, for each new bit print that is presented to the cataloging engine 700. In another embodiment, the cataloging engine 700 creates and stores a history for each group or set of related bit prints. In one embodiment, a history of a group of related bit prints (or "a family history") may include the date, the site, and other circumstances under which each content file was encountered. In another embodiment, the history stored by the cataloging engine 700 may include the date and time the file was encountered, the location where the file was encountered, and/or the owner of the site where the file was encountered.

In one embodiment, the cataloging engine 700 may store bit prints for several different versions of a content file and may store links between them based on output from the link parser 706. The cataloging engine 700 may store the link information in the bit print itself or the link database as described above. In one embodiment, the digital marketplace may automatically create these versions (note that they are each files themselves), bit prints for each file, and links between the files. In another embodiment, a publisher may create different bit prints for different formats of his content file, such as for a "thumbnail" or "preview" of the content and for the full content file itself. The publisher may also wish to create versions with, for example: high-resolution and low-resolution; different language tracks; or surround sound and stereo audio tracks. In another embodiment, the publisher may want to designate versions for use with different hardware such as: computer, television, or mobile phone.

In one embodiment, the cataloging engine 700 may receive bit prints and links for a number of reasons, including to perform catalog maintenance, to populate the catalog (e.g., a content file database, the bit print database 710 and/or the link database 712), to perform a request by a publisher to establish or protect his rights in a content file, to collect a royalty from a licensed user of a content file, and to monitor the creation of derivative works from the content file. In one embodiment, the cataloging engine 700 may receive bit prints and links from the crawler, the identification engine, the community server (e.g., from a user/publisher), or from the digital marketplace generally.

The cataloging engine 700 may identify a content file for inclusion by the community server in the subscription for the user. In one embodiment, the cataloging engine identifies a content file by metadata and ratings of the content file. In another embodiment, the cataloging engine identifies a content file by recommendations of the content file. In yet another embodiment, the cataloging engine identifies a content file by searches performed by the community server. In yet another embodiment, the cataloging engine identifies a file based on links between bit prints of files.

In one embodiment, the cataloging engine 700 may store bit prints and links in databases in such a manner that the bit prints and links are associated as a group or packaged content (which may be referred to as a digital package). For example, an image of an album cover may be associated as a group or packaged content along with the music files for that album. Another example is a movie file associated with extra scenes, out-takes, or trailers associated with the movie file as a group or packaged content. In one embodiment, the cataloging engine 700 may associate bit prints and links as groups or packaged content. The digital package itself my have its own bit print, as further described herein with respect to content file bit prints and elemental bit prints.

In one embodiment, a bit print or link may be part of more than one group or be included in more than one content package (e.g., packaged content). In another embodiment, files that are part of a group or packaged content may be separated or disassociated from the digital package. For example, rights in a file that is part of a digital package may be sold, licensed, or otherwise transferred separate from the digital package as a whole. For example, a user may wish to purchase rights in a section of a group of out-takes from a motion picture. In one embodiment, the cataloging engine 700 would retrieve the bit print for that section and pass the bit print to the arbitration engine. In another embodiment, if a bit print does not exist for the requested section, the community server or digital marketplace may request for a bit print to be created for that section, in much the same manner as discussed herein for newly encountered files.

Figure 8:
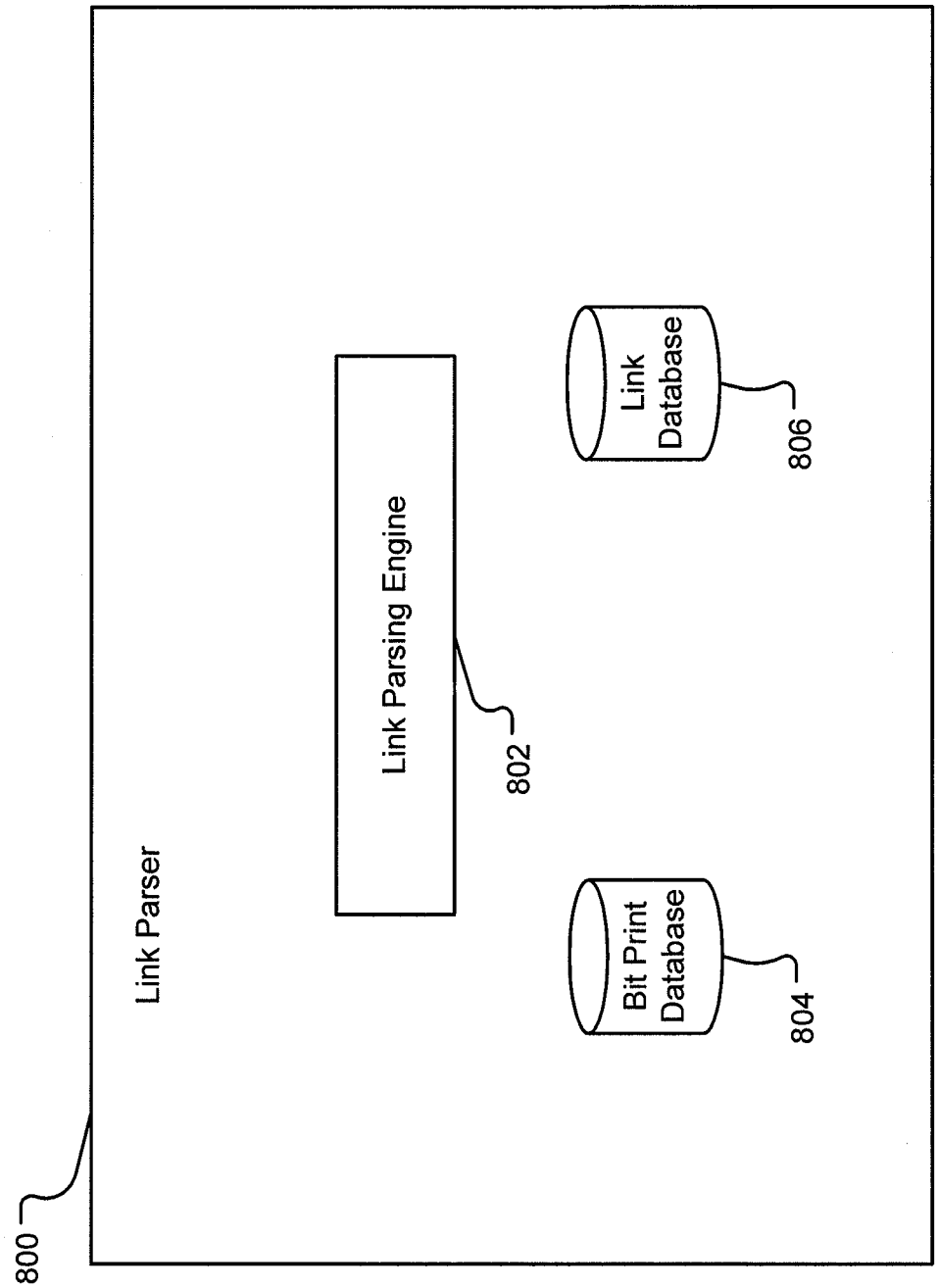
FIG. 8 illustrates an embodiment of a link parser.

FIG. 8 illustrates an embodiment of a link parser 800. The link parser 800 comprises a link parsing engine 802, a link database 806, and a bit print database 804. The link parser 800 receives a link from identification engine (with or without an accompanying bit print) and the link parsing engine 802 determines the number and kind of relationships described in the link and the linked bit prints described in the link. In one embodiment, the link parsing engine 802 may collapse complex relationships and may re-assign relationships, based on the link as provided to the link parser. For example, the link parsing engine 802 may find that a reference is made to or a relationship is formed with an "intermediary bit print," when the relationship could also be formed with a "master bit print" (which may correspond to a "master file" designated by a publisher as an original copy or version of the content). In another embodiment, the link parsed by the link parsing engine 802 describes a relationship with a ghost or clone bit print, instead of a master bit print, and the relationships could be more simply expressed if all the relationships referenced the master bit print, rather than some bit prints referencing one or more clone bit print(s). Thus, the link parsing engine 802 may collapse or simply relationships, to create relationships with a master bit print.

In one embodiment, the link parser 800 may store links in the link database 806 and may store bit prints in the bit print database 804. In another embodiment, the link database 806 may be used by the link parser 800 as a source for information on existing links so that the link parser may understand and simplify complex relationships as described above. In one embodiment, the bit print database 804 may also be used by the link parser 800 as another source of links and relationships. In another embodiment, the link parser 800 may use another link database and or another bit print database in the digital marketplace and may not have a link database or bit print database of its own (unlike that shown in the embodiment 800).

Figure 9:
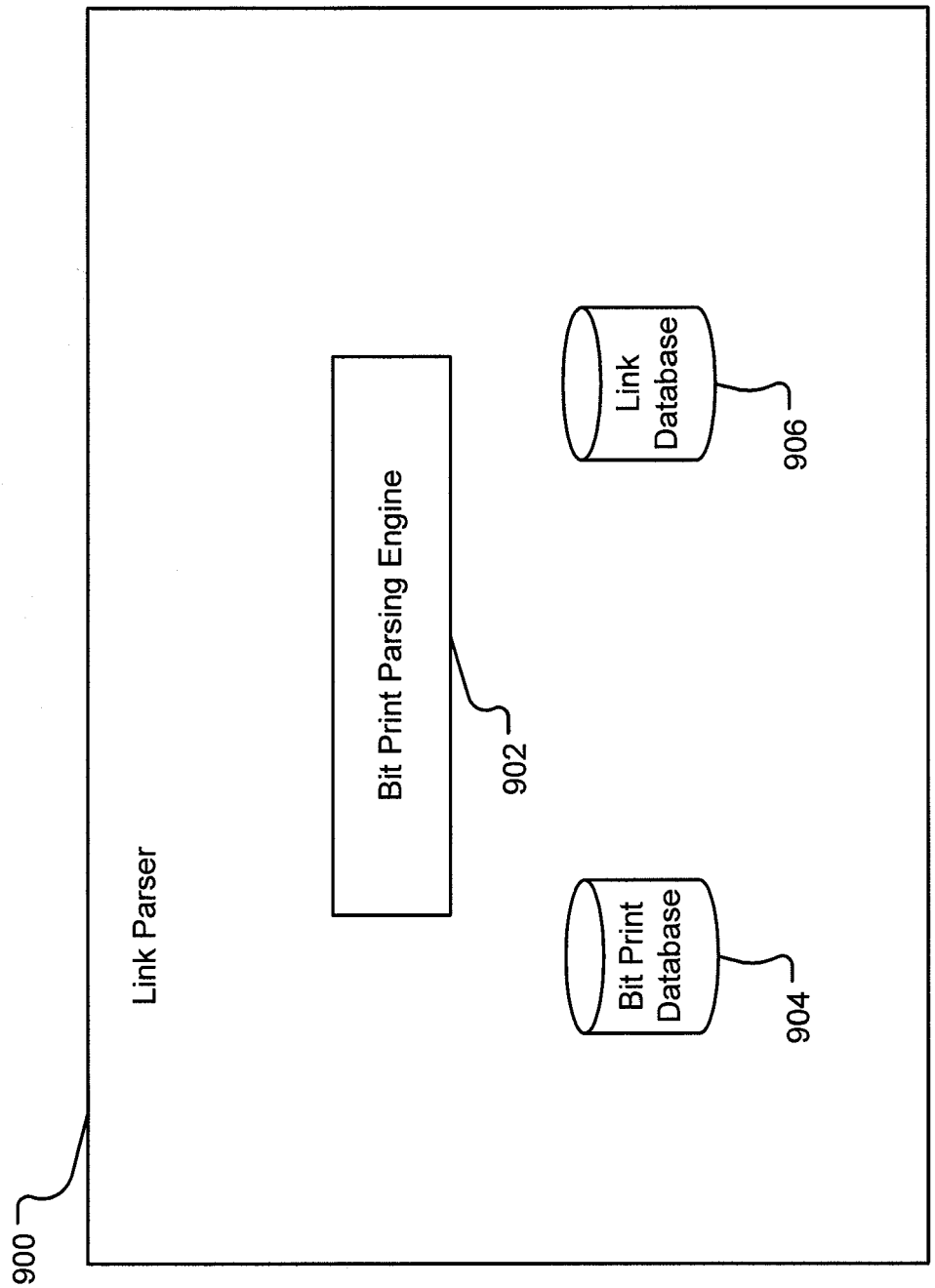
FIG. 9 illustrates another embodiment of a link parser.

FIG. 9 illustrates another embodiment of a link parser 900. The link parser 900 includes a bit print parsing engine 902, a bit print database 904 and a link database 906. The link parser 900 uses the bit print parsing engine 902 to parse a bit print to find links contained inherently in the bit print itself as described above. The bit print parsing engine 902 reads a bit print and determines whether it contains any elemental bit prints. The elemental bit prints represent or are associated with elements of a larger or parent content file. The elemental bit prints may be known to the cataloging engine (through the cataloging engines own databases e.g., a bit print database or a link database) or generally known to the digital marketplace. In one embodiment, the bit print parsing engine 902 may identify demarcations, segmentations, or groupings in the bit print being parsed and may decide to assign an elemental bit print to that grouping. Thus, the bit print parsing engine 902 may determine which bit prints are referenced inherently in the bit print. In another embodiment, the bit print parsing engine 902 may use the bit print database 904 as a source of bit prints with which to relate the bit print being parsed.

In one embodiment, the digital marketplace may use the cataloged bit prints stored in the cataloging engine to obtain recommendations for like content files. In another embodiment, the digital marketplace may use stored bit prints for searching for content as discussed above. In yet another embodiment, the digital marketplace may also use the cataloging engine for cross-referencing content files to enrich the experience of a user accessing the community server. For example, the community server may host a user with a subscription to content files (e.g., giving a user access to an unlimited number of content files, possibly in a certain genre, for a fixed price each month).

Figure 10:
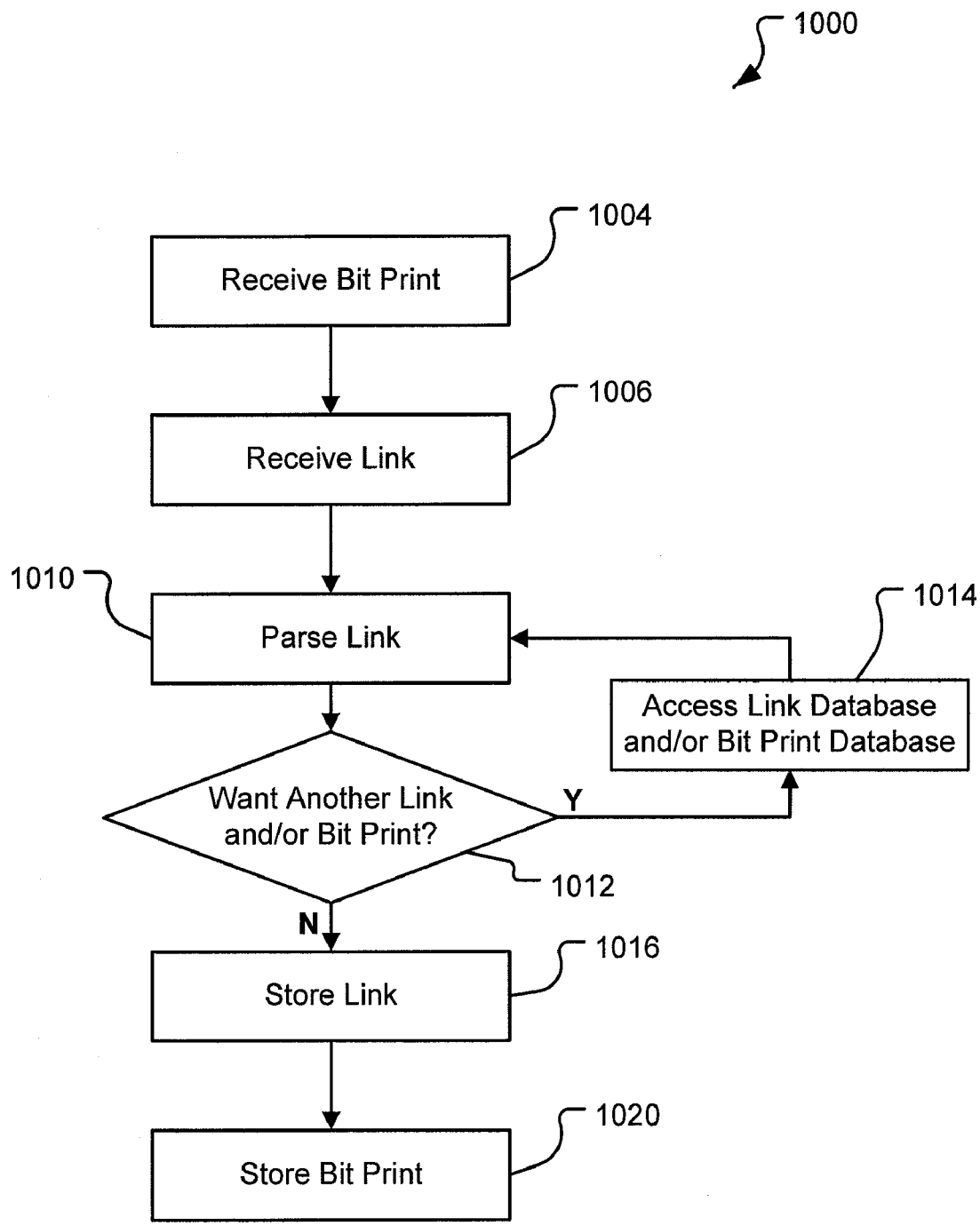
FIG. 10 illustrates an embodiment of a process for cataloging bit prints.

FIG. 10 illustrates an embodiment of a process 1000 for cataloging bit prints. The process includes receiving a bit print 1004, receiving a link 1006, parsing a link 1010, accessing a link stored in a database and/or a bit print stored in a database 1014. It should be noted that links may be stored internally in bit prints, as discussed herein, so the parsing may be performed on a bit print as well as a link. The bit print may also be received 1004, not parsed by the process, and stored according to the parsing 1010 of the link. In one embodiment, receiving 1004 a bit print and receiving a link 1006 are performed before the link is parsed 1010. The parsing of the link 1010 may be aided by the retrieval 1014 of another bit print or link. In one embodiment, the process determines whether another bit print or link is desired 1012 while parsing the link 1010. For example, after parsing a link is partially completed a new link or bit print may be useful to completing the parsing 1010. In another embodiment, determining 1012 may be completed, another link or bit print may be accessed 1014 and a second parsing 1010 may be initiated. After parsing the link 1010 is completed, the link may be stored 1016 and/or the bit print may be stored 1020. The storage of the link and/or bit print may be performed as described herein for cataloging bit prints.

In one embodiment, the process 1000 retrieves the link and/or bit print 1012 to aid in the parsing 1010 through accessing link and/or bit print databases. For example, a link being parsed may include reference to another link or a bit print. The parsing 1010 may, therefore, be aided by accessing a database 1014 to retrieve the link or bit print referenced. In one embodiment, the parsing 1010 is performed with links and bit prints retrieved from databases as well as a link received in 1006 and/or bit print received in 1004. In another embodiment, the parsing 1010 is performed based solely on the link and/or bit print received. In one embodiment, the process 1000 sorts, groups and stores links and/or bit prints in databases (e.g., 1016, 1020) based on relationships between the links and/or bit prints. In another embodiment, the process 1000 stores links and bit prints in databases (e.g., 1016, 1020) based on the order in which the links and/or bit prints are received 1004, 1006. In another embodiment, the process 1000 queries whether another link and/or bit print could be used for parsing the link 1012.

Figure 11:
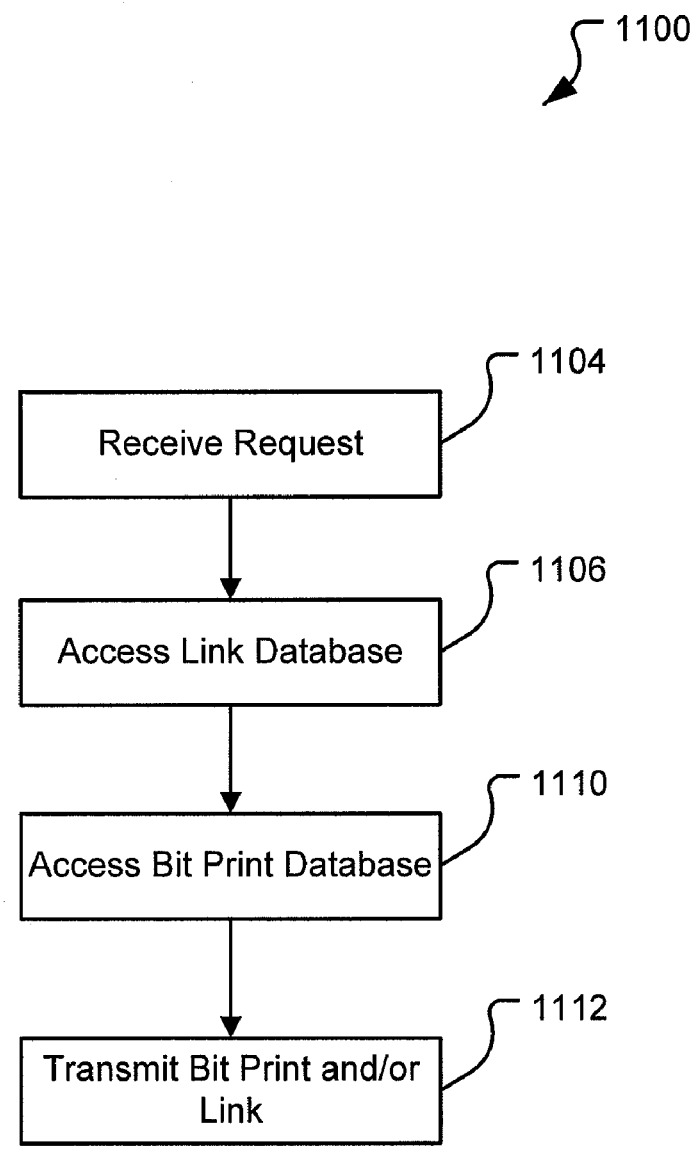
FIG. 11 illustrates an embodiment of a process for accessing bit prints and links from a catalog.

FIG. 11 illustrates an embodiment of a process 1100 for accessing bit prints and links from a catalog. The process includes receiving a request 1104, accessing a link database 1106, accessing a bit print database 1110, and transmitting a link and/or a bit print 1112. The request received may be any of the requests described herein sent to a cataloging engine. For example, the request received 1104 may be a request to find related bit prints or links to a provided bit print or link. In one embodiment, the request includes a bit print. In another embodiment, the request includes a link describing relationships between bit prints. In one embodiment, the request received may be to retrieve a bit print (or group of bit prints) based on a link (e.g., all bit prints related by the link). In another embodiment, the request may be to retrieve a link (or group of links) based on a bit print (e.g., all links that reference a bit print). Therefore, in one embodiment, accessing a link database 1106 and accessing a bit print database 1110 may be for different purposes, depending on the request received. In one embodiment, the process includes transmitting a bit print 1112 in response to the request. In another embodiment, the process includes transmitting a link 1112 in response to the request.

Figure 12:
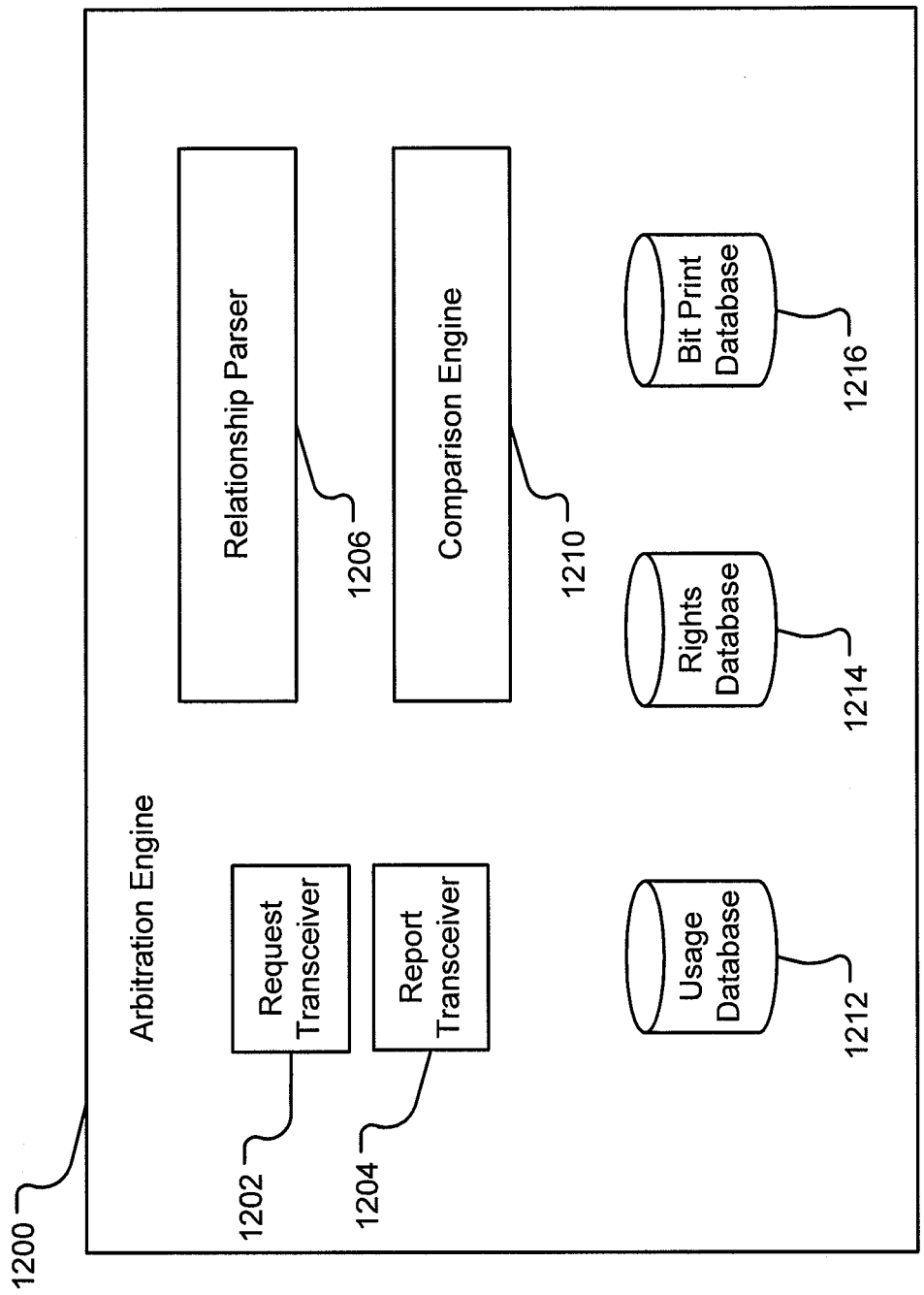
FIG. 12 illustrates an embodiment of an arbitration engine.

FIG. 12 illustrates an embodiment of an arbitration engine 1200. The arbitration engine 1200 may be used by the digital marketplace to determine which rights in a file are available (e.g., for sale, for license, or other use). The arbitration engine 1200 includes a rights database 1214, a usage database 1212, a comparison engine 1210, a bit print database 1216, a relationship parser 1206, a request transceiver 1202 and a report transceiver 1204. The bit print database 1216 may be a separate bit print database, or a different bit print database from the other bit print databases described herein. Alternatively, the bit print databases described herein may comprise the same database. Those with skill in the art will further understand the various ways in which databases may be distributed and/or shared.

The arbitration engine 1200 may receive requests from various parts of the digital marketplace, including the cataloging engine and the identification engine. Furthermore, the arbitration engine 1200 may receive requests from users through the community server, or from other entities. In one embodiment, a request received the arbitration engine 1200 includes a request to determine rights used, such as rights used by individuals on the Internet. In another embodiment, a request received includes a request for the resolution of conflicts in rights. In one embodiment, conflicts in rights may arise when a user owns rights that are used (e.g., displayed, copied, distributed) by another individual in a manner unauthorized by the user who owns the rights. In another embodiment, conflicts in rights (or rights conflicts) may arise when the ownership of rights in a content file is disputed between users.

In one embodiment, the arbitration engine 1200 utilizes the rights database 1214 and the usage database 1212 to determine the rights owned, the rights requested and/or the rights actually utilized to determine whether there is a conflict and/or recommend which rights (or which user) should prevail. In another embodiment, the arbitration engine 1200 uses the comparison engine to determine whether rights in the rights database 1214 are being violated by usages stored in the usage database 1212 (or otherwise known to the digital marketplace). Usage data stored on the usage database 1212 may reflect use on a public network or otherwise known to the digital marketplace.

In one embodiment, the arbitration engine 1200 will retrieve, depending on the request received, the rights, usages, and bit prints, relating to that request. In another embodiment, the arbitration engine 1200 will then send the rights, usages, and/or bit prints to the relationship parser 1206 and the comparison engine 1210, as appropriate. For example, a request may be received for determining rights that are available and usages that exist for a certain file. In one embodiment, the arbitration engine 1200 receives the request including a bit print associated with a content file. In another embodiment, the arbitration engine 1200 takes the bit print referenced in the request, searches the bit print database 1216, and sends related bit prints to the relationship parser 1206.

In one embodiment, the relationship parser 1206 determines the manner(s) in which related bit prints are related. For example, the relationship parser 1206 may determine that the bit print contained in the request for rights and usages is a derivative work of an original content file and may send to the rights database 1214 and usage database 1212 the bit print of that original content file along with a plurality of bit prints related to the original file. The relationship parser 1206 sends its results to the rights database 1214 and the usage database 1212 and then retrieves rights granted and available for those bit prints and usages of those bit prints (both past, present, and future usages).

The comparison engine 1210 then receives the result from the rights database 1214 and the usage database 1212. The comparison engine 1210 compares the rights of all the related bit prints (e.g., the bit prints sent to the right database 1214), the usages of those bit prints, and/or rights contained in the request. In one embodiment, the comparison engine 1210 may take all the rights granted in the relevant bit prints and subtract them from the fee simple rights in the content in order to obtain the rights available. For example, if an exclusive license to all the rights contained in all the bit prints related to an original content file were granted for a limited period of time (e.g., for one year from the present date), then the comparison engine 1210 may return a result stating that the rights available are the fee simple rights in the original content file (and all its derivatives) subject to the license.

In one embodiment, the relationship parser 1206 may be utilized by the arbitration engine 1200 to process bit prints stored in the bit print database 1216 to determine which bit prints are related. For example, a request may be received by the arbitration engine 1200 regarding a particular bit print. Such a request may be "what are the rights presently used for this content file?" In one embodiment, the relationship parser 1206 uses the bit print database 1216 to look up the bit print associated with the content file, as well as any related bit prints. In another embodiment, the relationship parser 1206 determines the relationships of the bit prints in the context of the request. For example, the relationship parser 1206 may determine that the content file was derived from another "original" content file and that there are several other content files derived from the original file. In one embodiment, the arbitration engine 1200 uses the relationship parser 1206 to determine whether an "original" content file is the derivational source for the content file requested (e.g., reformatted movie, a lower-resolution image, or a derivative song). In one embodiment, the relationship parser 1206 transmits the relationships between the related bit prints to the comparison engine 1210, for further processing, before the usage database 1212, and/or the rights database 1214 are accessed.

In one embodiment, the usage database 1212 may include information that is submitted by publishers to the community server relating to content files in which the publisher owns rights. In another embodiment, the usage database 1212 may also include information that is retrieved through the crawler, without any input from the publisher. In one embodiment, the usage database 1212 may also include rating information from the community server. In one embodiment, this rating information may be submitted by users. In another embodiment, this rating information may be extracted (e.g., interpreted) from searches performed by users, recommendations to other users (e.g., e-mailing of links between users), and/or any other usage data perceptible by the digital marketplace (e.g., requests to the arbitration engine 1200 to moderate disputes).

In one embodiment, the rights database 1214 may include information about rights that may be brokered (e.g., sold, licensed, or otherwise transacted) through the digital marketplace, or may include rights that are determined via usages in public forums (e.g., the Internet). In one embodiment, a right stored in the rights database 1214 may be contingent upon confirmation. For example, a right may be contingent if the digital marketplace merely surmises the right exists because of a usage of a content file in the public forum (e.g., via prominent display on a commercial web site over time). A contingent right may be subject to confirmation or dispute at a later time. In one embodiment, the rights database 1214 is subject to change if, for example, the arbitration engine 1200 determines a right associated with a particular bit print (whether or not the right was contingent) needs to be updated based on new proof of ownership of the right. In another embodiment, the rights database 1214 contains only confirmed rights. In this embodiment, the rights database 1214 could not be changed by results from the comparison engine. In another embodiment, the rights database 1214 may be changed based on information from the comparison engine and/or the usage database (e.g., to show a potential conflict in rights).

In one embodiment, the arbitration engine 1200 may change the rights database 1214, the usage database 1212 and/or the bit print database 1216 based on information received from the digital marketplace. In one embodiment, this information is a request received by the arbitration engine 1200 from a user or an entity inside the digital marketplace. Such a request may be for clarification of ownership rights, and may result in a change in the rights database 1214. For example, the crawler may encounter a usage that seems suspicious based on a right known by the digital marketplace, such as a content file that is being used in a manner that is inconsistent with the rights owned in that content file. In one embodiment, the digital marketplace attempts to clarify the situation by requesting the arbitration engine 1200 to verify the usage of the content file against the rights owned in the content file. In one embodiment, having established an inconsistency of the rights and usages of the content file, the digital marketplace and/or the arbitration engine 1200 may mark the rights in a digital content file as contingent or suspect. In another embodiment, the arbitration engine 1200 may mark the rights in that content file as violated. In one embodiment, based on the change of status of the rights in the content file (e.g., contingent and/or violated), the community server may alert the owners of the rights in the content file to help in the resolution of this conflict.

Figure 13:
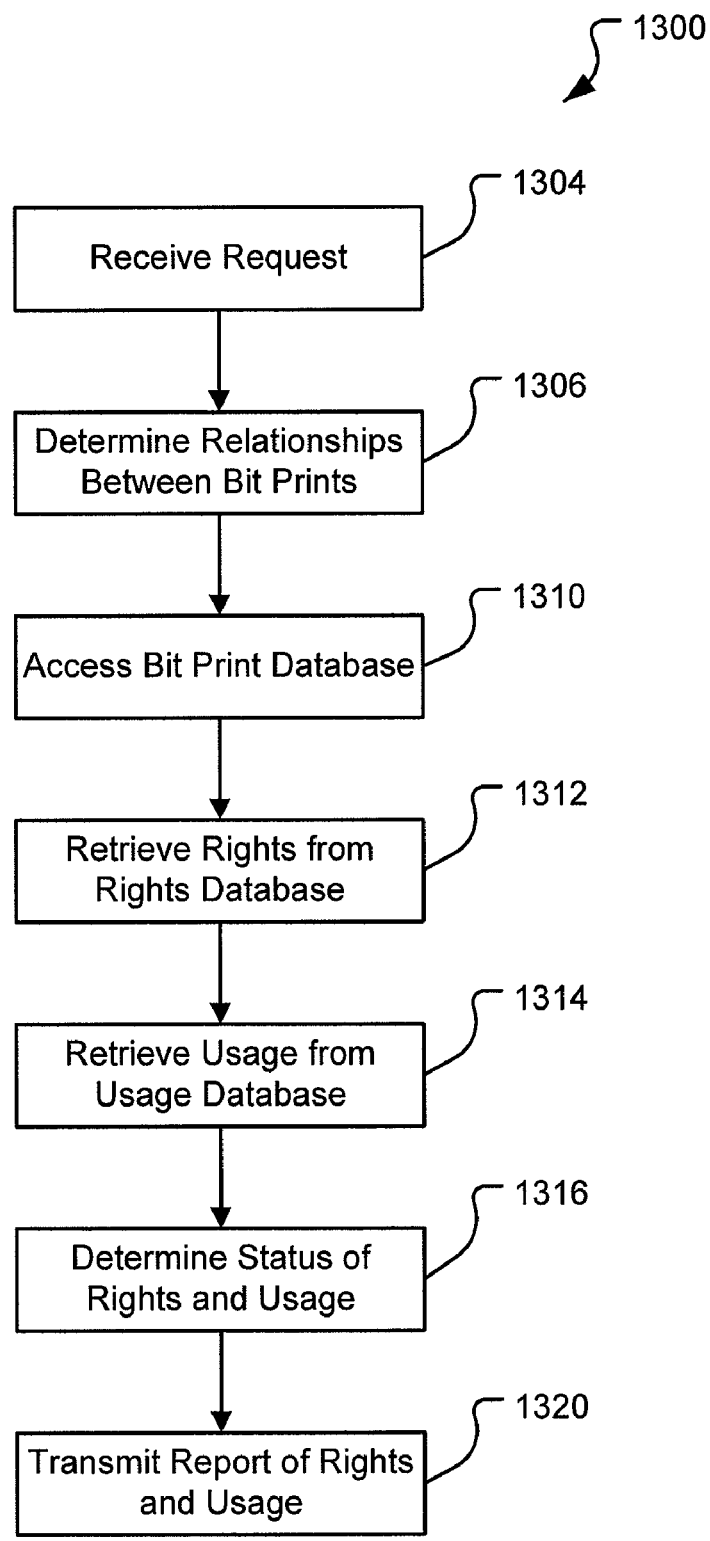
FIG. 13 illustrates an embodiment of a process of determining the rights and usage of a content file.

FIG. 13 illustrates an embodiment of a process 1300 of determining the rights and usage of a content file. The process includes, receiving a request 1302, generating a bit print, matching bit prints 1306, accessing a bit print database 1310, retrieving rights from a rights database 1312, retrieving a usage from a usage database 1314, determining a status of rights and usage 1316, and transmitting a report of rights and usage 1320. These processes have been described in detail above and their illustration in FIG. 13 is meant to incorporate all of the various embodiments described above, as well as many variations thereof. The description of this particular embodiment is meant to add to the above descriptions of methods and systems and this embodiment should be understood as another embodiment thereof.

In one embodiment, the request includes a bit print of a content file. In another embodiment, the request received in 1302 includes a file and a bit print is generated 1304 from the file in the request. In another embodiment, the request includes a link describing relationships between the first bit print and other bit prints. Each of these embodiments is described further herein.

The link may be used for matching 1306 a first bit print (the bit print received in 1302 or, alternatively, generated in 1304) to the other bit prints, including bit prints not explicitly related to the first bit print by the link. In one embodiment, matching bit prints 1306 requires accessing a bit print database 1310 to retrieve similar, related or linked bit prints to the first bit print (e.g., via a link) generated in 1304 or in the request.

In one embodiment, the process 1300 determines a status of usage and rights 1316 based on the bit print and/or link provided in the request and the status of similar, related or linked bit prints. In another embodiment, the process does not access a bit print database 1310 and determines a status of usage and rights 1316 based solely on the bit print and/or link provided in the request.

In one embodiment, the process 1300 includes information about all related or linked bit prints in the report of usage and rights transmitted 1320. In one embodiment, the process 1300 accesses the usage database 1316 and stores information relating to the received request in the usage database. For example, receiving a request for an arbitration of rights and usage of a content file may constitute or indicate a usage of the content file.

Figure 14:
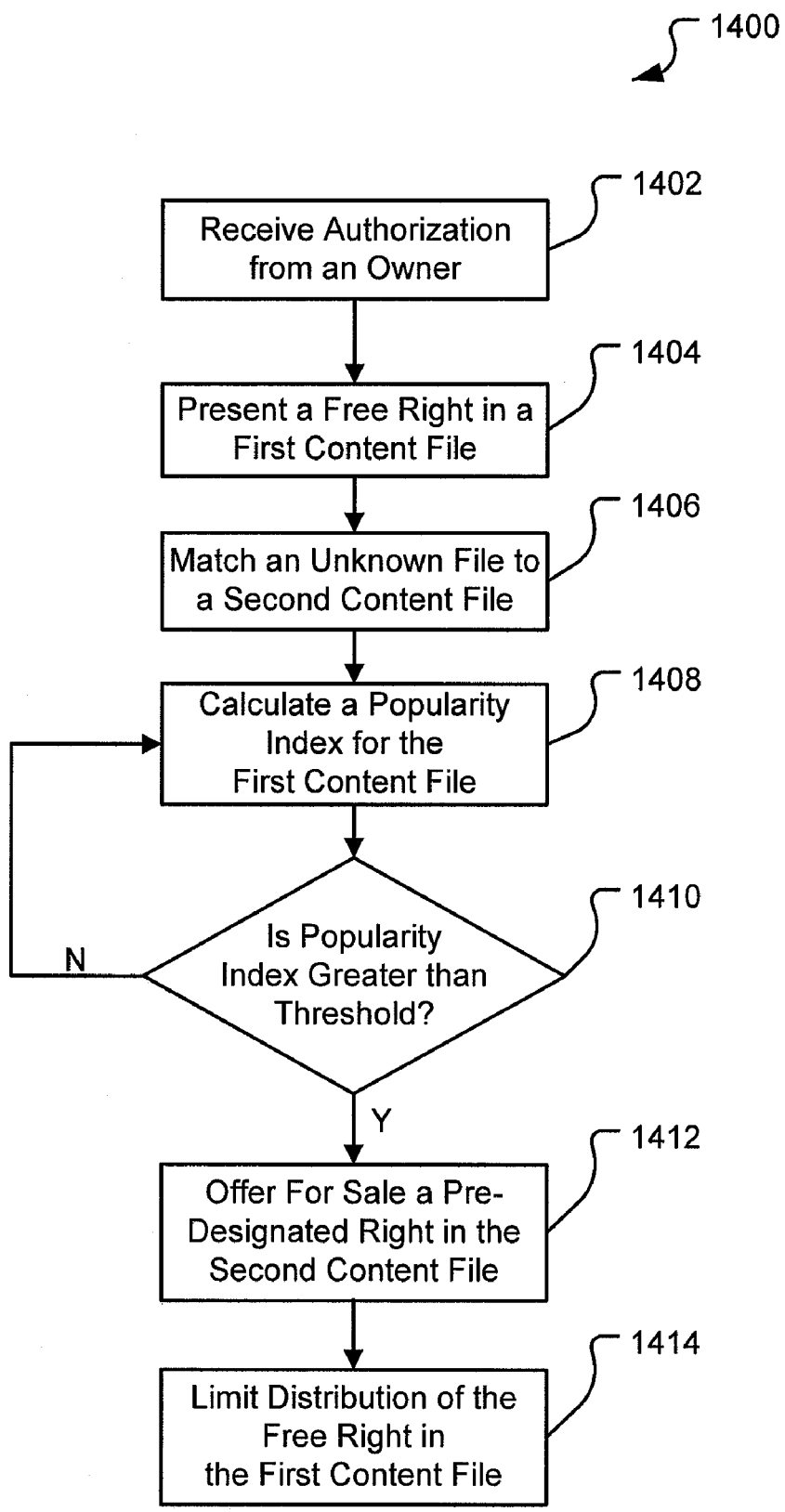
FIG. 14 illustrates an embodiment of a process for offering for sale a pre-designated right in a content file.

FIG. 14 illustrates an embodiment of a process 1400 for offering for sale a pre-designated right in a content file. The process offers for sale a right in a content file with the authorization of the owner of the right in the content file. The owner of the right may therefore, pre-authorize 1402 that rights, which may be called pre-designated rights, in the content file may be offered for sale under certain circumstances. Those circumstances and the process of determining when those circumstances have occurred is described further below.

The owner may wish to present a right in the content file for free to users of a publicly accessible network. It is becoming commonplace for advertising and/or marketing to be performed over a publicly accessible network, such as the Internet. For example, marketing through word-of-mouth based on free uses, or so-called "viral marketing," may be used by owners of rights in a content file to raise market interest in the content file or other files of the owner. In some instances, however, after giving away a right in a content file, an owner may wish to sell a right in that content file or another content file. The popularity of the content file may bolster the marketability of another right in the same content file or of a right in another content file. Therefore, the process 1400 may present a free right in a content file and, based on certain criteria discussed below, automatically offer for sale a right in the content file.

In the embodiment shown, authorization is received 1402 from the owner of a right in a content file. The authorization is limited to the rights in the content file which are owned by the owner. For example the owner may own a master right in the content file. A master right may allow the owner to distribute non-exclusive licenses in the content file, as well as similar licenses in all related content files. One example of a master right is the entire bundle of rights in a copyright owned by an original creator of a piece of media or content. Another example of a master right is an exclusive license in a content file which allows for control over distribution.

Authorization may be received 1402 from an owner to distribute a free right in the content file on a free basis to the public. For example, an owner of an image file may authorize a community server to display the image file publicly on a network, in a certain resolution and with certain protections or watermarks (e.g., copyright notice, the word "proof"). Authorization may be received 1402 from the owner to offer for sale the right or another right in the content file or a right in another content file based on certain criteria being met. For example, if the content file is rendered, for example, an image file is viewed, a song/video is played a certain number of times within a given time frame, or by a certain number of different users. Other criteria will be discussed below.

The owner's authorization received may include many different pre-designated rights to be offered for sale based on different criteria being met. In addition, different prices may be requested by the owner for the different pre-designated rights or based on different criteria being met. For example, one pre-designated right in the content file may be offered for sale for one price in response to one criterion being met, and, in response to another criterion being met, the same or another pre-designated right in the content file may be offered for sale for the same or a different price.

In one embodiment, each content file discussed with respect to FIG. 14 may be a different content file. For example, a first content file may be a display content file, such as a thumbnail, a trailer, or a low resolution content file. A second content file may be a full-length content file, a commercial free content file, or a high resolution content file. The same right or a different right may be sold in the second content file while the right is given away for free in the first content file. For example, an owner may wish to entice users with a content file (e.g., edited or lower resolution version) so that the users will want to buy a right in another content file (e.g., higher resolution or unedited version).

In another embodiment, each content file discussed with respect to FIG. 14 is the same content file. For example, a single content file could be used to market or advertise the sale of a right in the content file. A right may be given away for free or otherwise used by a user without other rights (e.g., rights which an owner hopes to sell) being able to be used. DRM software/hardware may restrict the use of different rights in the same file. For example, one key/password may allow use of a first right in the content file and another key/password may allow use of a second right in the same content file. Other DRM techniques are known to those with skill in the art and may be used.

In one embodiment, a content file may be received from the owner. The owner may upload a file to the community server for presentation of a free right in the content file and the offering for sale of a pre-designated right in the content file. In another embodiment, the community server may create different versions of the content file. An owner may be able to upload an unprotected, high-quality version of a content file, and then different content files embodying different formats may be created (e.g., by the community server or a DRM engine therein) to limit use to the free right in the content file as authorized by the owner.

In one embodiment, the different content file is a differently-formatted version of the content file. For example, the different content file may be a related content file (as described further herein) containing the same content, only at a different resolution. The owner may upload different content files for public presentation of the free right than for offering for sale of the pre-designated right. The different content file may be another version of the content file, such as a DRM-protected version or otherwise protected version.

The process 1400 presents a content file 1404 for the use of a free right. The free right may be offered to the public, such as the group of all registered users of a community server. The free right in the content file may also be presented to a user who selects the file for viewing or otherwise rendering. The free right in the content file may be accessed by the public with the access via being searchable by the public. For example, a user may search using a keyword or tag and may select the content file from among the results of the search. The free right in the content file may then be presented to the user. Other methods of presenting files and rights in the files are known to those with skill in the art.

A popularity index of a content file may be calculated 1408 to determine if a criterion is met, in order to determine whether to offer for sale a right in a content file. For example, a criterion may be a popularity index exceeding a threshold, as discussed further below. A popularity index is not limited to types of data which indicate a "popular" content file, such as voting, ranking, rating, or other subjective data given by a group of users. Calculating a popularity index 1408 may take into account any of these data, and may use data compiled from objective measures, such as usage data. Usage data of several types may be used in determining a popularity index of a content file, and are discussed further herein.

A popularity index calculated in 1408 can be represented in many forms. For example, a popularity index may be a scalar number, a vector, a group of numbers, an array, or a plurality of scores in a plurality of categories. A popularity index may be calculated 1408 in a form with a combination of forms, such as a popularity index comprising a digit indicating whether a request to buy a right in the content file has been received in the last week, an aggregate average of number of views weighted by ratings related to those views, and a derivative of the aggregate average over the last week.

A threshold may be represented in any of the forms of the popularity indices. In addition, the comparison of a popularity index and a threshold may be more than a simple scalar comparison of which is greater. The comparison may include a comparison of categories, weighting or other statistical techniques known to those skilled in the art.

A popularity index may be calculated 1408 in a form to match the form of a threshold against which popularity index may be compared 1410. For example, if a threshold has an array of numbers, the popularity index could have an array of numbers. A popularity index and a threshold may be compared even if they are of dissimilar forms, for example, through using categories of the forms which are similar.

The following discussion of how a popularity index is calculated should be understood also to apply to the calculating of a threshold. In one embodiment, a threshold may represent a time-delayed or otherwise modified popularity index, which when compared to a popularity index may be used to determine whether a criterion has been met. For example, a criterion may be that usage data of a file is increasing at a particular rate within a particular group of usage characteristics. In this case, a threshold may be composed of one or more past popularity indices.

A popularity index may be calculated 1408 at any time, based on events, or periodically updated. For example, a popularity index may be calculated 1408 whenever usage data are updated (e.g., usage data on which the popularity index depends). A popularity index may be calculated 1408 when a request for buying a right in content file is received. A popularity index may be calculated 1408 when a triggering event is detected. The triggering event may be an event on a publicly accessible network (e.g., a content file being on a "Top 100" list, the file being mentioned on a particular website). A triggering event may a detected use by a user (e.g., through searching the playlist of the user). For example, a use by a user may be detected based on information stored on a user's perception device (e.g., a media player, a portable media device).

In one embodiment, a popularity index is calculated 1408 in response to matching an unknown file to a content file 1406. For example, data used in creating the popularity index may be retrieved and compiled after the matching 1406. The matching operation 1406 may provide data for the calculating of the popularity index 1408, as will be described further below. In another embodiment, the popularity index calculated in 1408 has been created in advance of the matching operation. For example, popularity indices may be created, updated and stored in an on-going basis.

A popularity index and/or a threshold may be set by information automatically compiled by a computer, a digital marketplace or a community server. The breadth of data used may include any pertinent data known by such a computer, digital marketplace or community server.

The process of calculating 1408 a popularity index may weight data in several manners. For example, more recent information may be weighted more heavily than less recent information. Data associated with purchases and sales (e.g., ratings associated with sales) may be weighted more heavily than data relating to ratings, usages, or requests not associated with purchases or sales. Data associated with registered users (e.g., data created by activities of registered users) may be weighted more heavily than data not associated with registered users. Data relating to a registered user may be normalized with respect to the user's other activities. For example, a user who often gives a poor rating to a particular type of content file may have his ratings of content files normalized to reflect that fact. Those with skill in the art will be aware of several methods of adjusting data based on other data, such as statistical methods of normalization.

Data used for calculating a popularity index in 1408 may include data about the content file and/or about other content files. The data may be related to ratings of a content file, ratings of related content files, ratings of commonly-owned content files (e.g., owned by the same owner). The data may be collected from files known to be related to the content file and from files determined to be related to the content file. Other files may contribute several types of data, including usage data, ratings data, user information associated thereto (e.g., weighing the ratings of various users), numbers of related bit prints, requests to purchase the content file and/or the related files, and ratings of commonly-owned content files.

These data from other content files may be compared to, combined with, or modified by data associated with the content file for which the popularity index is being calculated. For example, data used to calculate a popularity index 1408 for a content file may be normalized to reflect data of other (e.g., related) content files. Data may be retrieved from another source, or may be stored locally. Any other data known to digital marketplace as described further herein may be used to calculate a popularity index 1408.

Usage data of an unknown file may be used after it is matched 1406 to the content file for which a popularity index is calculated 1408. Such data may be used in addition to the usage data of the content file. For example, an unknown file may have usage data from uses occurring before the unknown file is matched 1406 to the content file. The process of matching files is described in detail (e.g., using bit prints) further herein.

An owner who is requesting that a right in the content file be offered for sale based on the comparison of a popularity index and a threshold may influence how the popularity index and/or the threshold is calculated. In one embodiment, the owner may assist or guide the calculation of a popularity index (and/or threshold). The owner may be able to design how a popularity index (and/or threshold) is calculated. For example, the owner may be able to submit information which should be taken in to consideration for the calculations. The owner may submit types of usage data, other files, attributes, or other data which he believes should be used in creating a popularity index. The owner may submit desired threshold(s) associated with a popularity index. The owner may submit desired ways of calculating thresholds. Data submitted by an owner may be used to create the process of calculating a popularity index and/or a threshold.

An owner may wish to create different popularity indices associated with different rights in the content file. An owner may wish to have a different threshold for each popularity index. Therefore, for a particular content file, there may be many popularity indices and thresholds which are compared in order to trigger the sale of rights in the file. For example, a threshold may be associated with a right for a single use of a content file, another threshold may be associated with a right to use the content file as reformatted or remixed with advertisements, and another threshold may be associated with a right to use the content file for personal use (e.g., copying to different digital media players, burning to a CD or DVD).

In one embodiment, a right may be received along with a threshold from the owner. In another embodiment, a right may be selected to be sold by the owner and the threshold and popularity index associated with selling that right may be calculated on behalf of the owner based on data known to a community server as discussed herein.

An owner may wish to see popularity indices and thresholds which would be calculated based on his guidance in order to confirm that his guidance will create the appropriate popularity indices and thresholds. In one embodiment, rights and associated popularity indices and thresholds are returned to the owner for review. Hypothetical scenarios in which the thresholds would be met or satisfied, and suggested prices for the rights to be offered for sale upon meeting the thresholds may also be returned to the owner.

Based on a comparison of a popularity index 1410 with a threshold, a right may be offered for sale 1412. In the embodiment shown, the popularity index is compared to the threshold 1410 and, if the popularity index is determined to be greater than the threshold, a right is offered for sale 1412. However, as described above, the popularity index and the threshold may be more complex than scalar numbers and comparing them may be more complex than determining which is greater.

Offering for sale 1412 a right in the content file may be performed to a single user, a group of users, or to the public over a publicly accessible network. For example, a right in a content file may be offered to registered users of a community server or to the general public including users who are not registered users of a community server. Offering for sale 1412 a right in the content file may be performed in any of several manners, including ways commonly known or known to those skilled in the art.

After a right in a content file is offered for sale 1412, the distribution of the free right in the content file may be limited 1414. In one embodiment, if the free right had previously been offered for free public use, the free right may no longer be made available. In another embodiment, another free right in the content file (or in a related content file) may be offered for free public use. In another embodiment, the free right in another content file may be offered for free public use. The other content file may be a modified version of the content file. For example, the modified version may include advertisements, may be an edited version of the content file, or may be mixed with yet another content file (thereby providing an opportunity to cross-market two content files).

Figure 15:
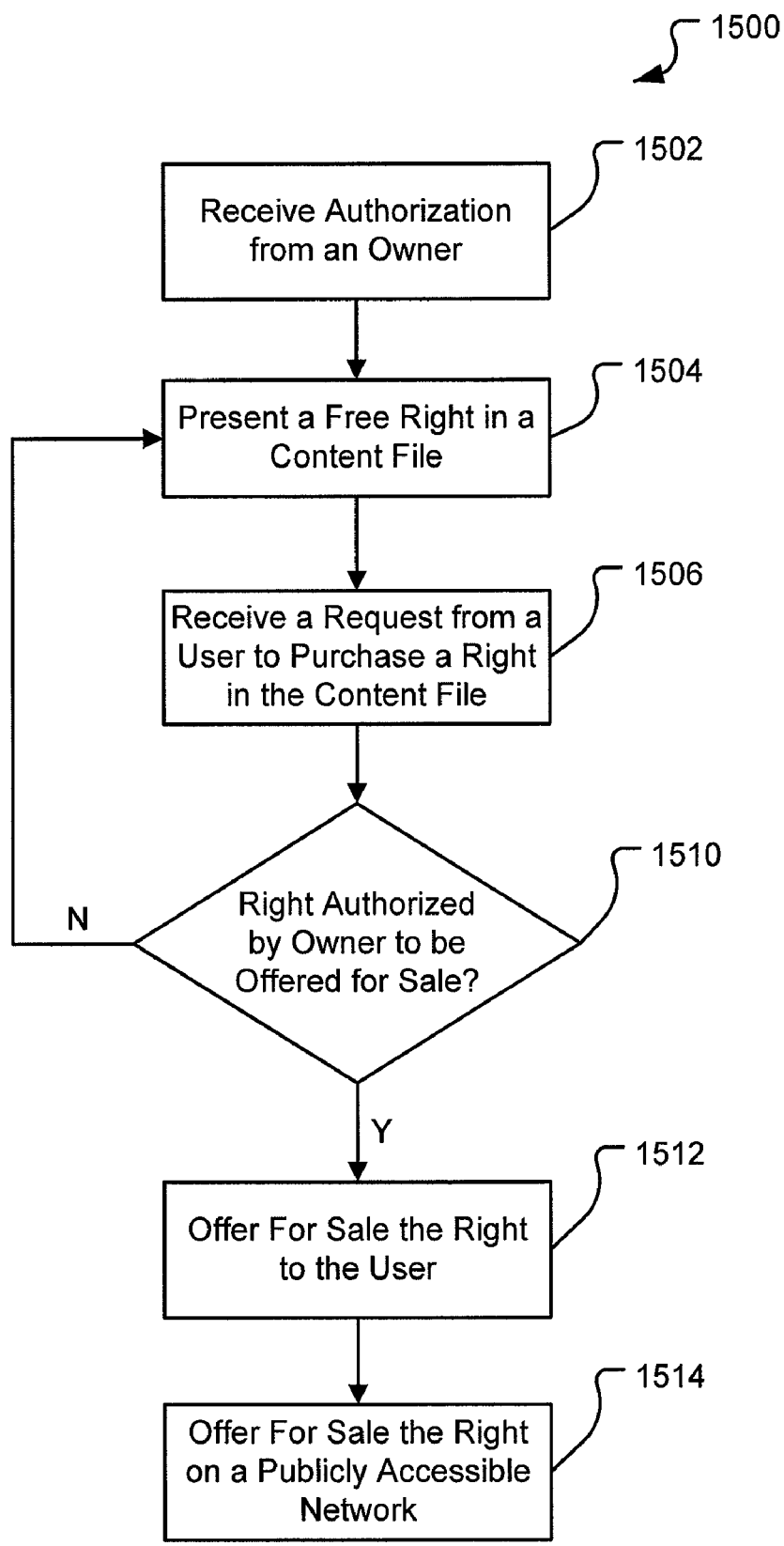
FIG. 15 illustrates another embodiment of a process for offering for sale a pre-designated right in a content file.

FIG. 15 illustrates another embodiment of a process 1500 for offering for sale a pre-designated right in a content file. The process includes receiving authorization from an owner 1502 to present a free right in a content file 1504. Authorization may also be received 1502 from an owner to offer a right (e.g., a pre-designated right) for sale based on a user requesting to purchase that right in the content file or another right in the content file. These operations are further described above with respect to FIG. 14.

A request received from a user 1506 to purchase a right in the content file triggers similar processes as those discussed in FIG. 14 with respect to comparing a popularity index with a threshold. However, the right requested by a user may not be designated by the owner as a right which should be offered for sale. Therefore, the right request is checked 1510 against rights authorized 1502 by the owner for sale.

If there is a match between the right requested by the user in 1506 and the right(s) authorized by the owner in 1502 to be offered for sale, the right requested in 1506 may be offered for sale to the user 1512. Imperfect matches between the right requested and the right authorized may also lead to offering for sale the authorized right in the content file.

In addition, the user may request the sale of a right, yet leave the right unspecified in his request. In this case, a right may be inferred from the request. For example, a default right (such as a non-exclusive license to render the content file from a remote location) may be inferred. As another example, a right may be selected from among the rights authorized to be sold in the content file.

Offering for sale 1512, 1514 a right in the content file may be performed to the user who requested the sale of the right 1512, to a group of users (including the user who requested the sale), or to the general public over a publicly accessible network 1514. For example, a right in a content file may be offered for sale 1514 to registered users of a community server or to the general public including users who are not registered users of a community server. Offering for sale 1512, 1514 a right in the content file may be performed in any of several manners, including ways commonly known or known to those skilled in the art.

As described herein, functional elements being performed by a single or multiple components, in various combinations of hardware and software, and individual functions may be distributed among functional elements at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. In addition, elements of the systems described herein may be distributed geographically or functionally in any configuration.

Elements of the systems described herein may be implemented in hardware, software, firmware, any combination thereof, or in another appropriate medium. Thus, myriad software, hardware, and/or firmware combinations are possible in achieving the functions, features, interfaces and preferences described herein. The systems described herein may implement any part of the methods described herein. In addition methods described herein when implemented in hardware, software, firmware, any combination thereof, or in another appropriate medium may form any part of the systems described herein. Therefore, the descriptions of the methods and systems herein supplement each other and should be understood by those with skill in the art as forming a cohesive disclosure.

The methods described herein may be performed iteratively, repeatedly, and/or in parts. In addition, some of the methods or parts of the methods described herein may be performed simultaneously.

What is claimed is:

1. A method comprising:
   presenting, via a community server comprising at least one processor, a free right in a first content file for public use over a publicly accessible network;
   collecting overall current data usage of the first content file by a plurality of users on the network;
   calculating, via the community server, a popularity index for the first content file based on the collected overall current usage data of the first content file, said calculating comprises weighing the usage data according to individual designations of each of the plurality of users, the usage data comprising all data statistically related to metadata of the first content file; and
   based on a comparison of the popularity index for the first content file with a threshold, wherein said comparison comprises determining that the popularity index exceeds the threshold, and wherein said comparison comprises categorically comparing a form of the popularity index and a form of the threshold, offering for sale, via the community server, on the publicly accessible network a pre-designated right in a second content file, wherein the pre-designated right in the second content file is a right in the second content file authorized by an owner to be offered for sale, wherein the owner owns a master right in the first content file and the master right in the second content file, the master right including a right to distribute the free right and a right to distribute the pre-designated right.

2. The method of claim 1, wherein the free right in the first content file is a right to access the first content file in a first format and wherein the pre-designated right in the second content file is a right to access the second content file in a second format.

3. The method of claim 1, wherein the free right in the first content file is a right to render the first content file from a remote location and wherein the pre-designated right in the second content file is a right to copy the second content file to a permanent computer-readable medium.

4. The method of claim 1, further comprising:
   selecting the pre-designated right from a plurality of different pre-designated rights, wherein each of the plurality of different pre-designated rights is a different right authorized by the owner to be offered for sale in the second content file.

5. The method of claim 1, further comprising:
   receiving the second content file from the owner; and
   receiving a request from the owner to present for public use on the publicly accessible network the free right in the first content file.

6. The method of claim 1, wherein the usage data of the first content file are data selected from user requests for the first content file, user ratings of the first content file, and user ratings of a different commonly owned content file.

7. The method of claim 1, further comprising:
   limiting distribution of the free right in the first content file based on the comparison of the popularity index with the threshold.

8. The method of claim 1, further comprising:
   receiving an unknown file; and
   matching the unknown file to the second content file.

9. The method of claim 8, further comprising:
   calculating the popularity index in response to matching the unknown file to the second content file.

10. The method of claim 9, wherein calculating the popularity index is performed based on unknown file usage data.

11. The method of claim 10, wherein the unknown file usage data includes user requests for the unknown file.

12. A method comprising:
   presenting, via a community server comprising at least one processor, a free right in a first content file for public use on a publicly accessible network;

receiving, at the community server, a request over the publicly accessible network from a user to purchase a first right in the content file receiving, from an owner, a request to offer the first right in the content file for sale based on receiving the request from the user to purchase the first right in the content file, wherein the receiving the request from the owner is performed before the receiving the request from the user;

determining, via the community server, whether the first right in the content file is authorized by the owner to be offered for sale and whether metadata of the content file satisfies a statistical threshold based upon a determination relating to all data statistically related to the content file metadata, said metadata being weighted according to designations of the user, wherein the owner owns the first right in the content file; and if the first right is authorized by the owner to be offered for sale and the statistical threshold is satisfied, wherein said authorization comprises categorically comparing a form of the data statistically related to the content file metadata and a form of the threshold, offering, via the community server, the first right in the content file for sale to the user over the publicly accessible network, wherein the owner owns a master right in the content file, the master right including a right to distribute the free right and a right to distribute the first right.

13. The method of claim 12, wherein the first right in the content file is a right to access the content file in a first format and wherein the free right in the content file is a right to access the content file in a second format.

14. The method of claim 12, wherein the first right in the content file is a right to render the content file from a remote location and wherein the free right in the content file is a right to copy the content file to a permanent computer-readable medium.

15. The method of claim 12, further comprising:
offering the first right in the content file for public sale on the publicly accessible network.

16. The method of claim 12, further comprising:
limiting distribution of the free right in the content file based on the receiving the request from the user.

17. A system comprising:
a community server comprising at least one processor which presents a free right in a content file for public use on a publicly accessible network;
a cataloging engine, implemented by the community server, which collects current overall data usage of the content file by the plurality of users on the network, and calculates a popularity index for the content file based on the overall current usage data of the content file, said calculating comprises weighing the usage data according to individual designations of each of the plurality of users, the usage data comprises all data statistically related to metadata of the first content file;
wherein the community server offers for sale on the publicly accessible network a pre-designated right in the content file based on a comparison of the popularity index of the content file with a threshold, wherein said comparison comprises determining that the popularity index exceeds the threshold, and wherein said comparison comprises categorically comparing a form of the popularity index and a form of the threshold, wherein the pre-designated right in the content file is a right in the content file authorized by an owner to be offered for sale, wherein the owner owns a master right in the content file, the master right in the content file including a right to distribute the free right in the content file and a right to distribute the pre-designated right in the content file; and
an arbitration engine which selects the pre-designated right from a plurality of different pre-designated rights, wherein each of the plurality of different pre-designated rights is a different right in the content file authorized by the owner to be offered for sale.

18. The system of claim 17, wherein the community server receives a request from a user to buy the pre-designated right in the content file; and
wherein the community server presents for sale on the publicly accessible network the pre-designated right in the content file based on the request received.

19. The system of claim 17, wherein the first right in the content file is a right to access the content file in a first format and wherein the free right in the content file is a right to access the content file in a second format.

20. The system of claim 17, wherein the first right in the content file is a right to render the content file from a remote location and wherein the free right in the content file is a right to copy the content file to a permanent computer-readable medium.

21. The system of claim 17, wherein the community server receives the content file from the owner; and
wherein the community server receives a request from the owner to present for public use on the publicly accessible network the free right in the content file.

22. The system of claim 17, wherein the usage data of the content file are data selected from user requests for the content file, user ratings of the content file, and user ratings of other content files associated with the owner.

23. The system of claim 17, wherein the community server retrieves usage data of the content file from a database selected from a ratings database, a user information database, and a metagraphics database.

24. The system of claim 17, wherein the community server limits distribution of the free right in the content file based on the comparison of the popularity index with the threshold.

25. The system of claim 17, wherein the community server receives an unknown file, the system further comprising:
a comparison engine which determines whether the unknown file is related to the content file based on matching a bit print of the unknown file and a bit print of the content file.

26. The system of claim 25, wherein the cataloging engine calculates the popularity index if the unknown file is related to the content file.

27. The system of claim 26, wherein the cataloging engine calculates the popularity index based on unknown file usage data.

28. The system of claim 27, wherein the unknown file usage data includes user requests for the unknown file.

* * * * *